US011985612B2

United States Patent
Jung et al.

(10) Patent No.: US 11,985,612 B2
(45) Date of Patent: May 14, 2024

(54) METHOD AND APPARATUS FOR TRANSMITTING AND RECEIVING SIGNAL INCLUDING CELL INFORMATION IN COMMUNICATION SYSTEM

(71) Applicant: ELECTRONICS AND TELECOMMUNICATIONS RESEARCH INSTITUTE, Daejeon (KR)

(72) Inventors: Hoi Yoon Jung, Daejeon (KR); Sung Ik Park, Daejeon (KR); Heung Mook Kim, Daejeon (KR); Nam Ho Hur, Sejong (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 524 days.

(21) Appl. No.: 17/277,061

(22) PCT Filed: Sep. 16, 2019

(86) PCT No.: PCT/KR2019/011940
§ 371 (c)(1),
(2) Date: Mar. 17, 2021

(87) PCT Pub. No.: WO2020/060127
PCT Pub. Date: Mar. 26, 2020

(65) Prior Publication Data
US 2021/0377883 A1 Dec. 2, 2021

(30) Foreign Application Priority Data

Sep. 20, 2018 (KR) .................. 10-2018-0112643
Jan. 18, 2019 (KR) .................. 10-2019-0006621
(Continued)

(51) Int. Cl.
*H04W 56/00* (2009.01)
*H04L 5/00* (2006.01)

(52) U.S. Cl.
CPC ......... *H04W 56/001* (2013.01); *H04L 5/0048* (2013.01); *H04W 56/003* (2013.01)

(58) Field of Classification Search
CPC . H04W 56/001; H04W 56/003; H04W 48/08; H04W 48/10; H04W 56/00;
(Continued)

(56) References Cited

U.S. PATENT DOCUMENTS 10,110,428 B2   10/2018  Um et al.
2010/0128805 A1  5/2010  Tanno et al.
(Continued)

FOREIGN PATENT DOCUMENTS

KR   10-1307980 B1   9/2013
WO   2016/126119 A1  8/2016
(Continued)

OTHER PUBLICATIONS

Intel Corporation, "SS block composition", R1-1707337, 3GPP TSG RAN WG1 Meeting RAN1 #89, Hangzhou, P.R. China, May 7, 2017.
(Continued)

*Primary Examiner* — Abdullahi Ahmed
(74) *Attorney, Agent, or Firm* — Rabin & Berdo, P.C.

(57) ABSTRACT

Disclosed are a method and an apparatus for transmitting and receiving a signal including cell information in a communication system. An operation method of a terminal comprises the steps of: receiving a first SS/PBCH block from a base station; receiving a second SS/PBCH block from the base station after receiving the first SS/PBCH block; and confirming information included in the first SS/PBCH block and the second SS/PBCH block by per-
(Continued)

forming a combining operation on the first SS/PBCH block and the second SS/PBCH block when a transmission beam of the first SS/PBCH block is the same as a transmission beam of the second SS/PBCH block. Therefore, the performance of a communication system can be improved.

19 Claims, 17 Drawing Sheets

(30) Foreign Application Priority Data

Mar. 29, 2019 (KR) .......................... 10-2019-0036720
Aug. 16, 2019 (KR) .......................... 10-2019-0100658

(58) Field of Classification Search
CPC .............. H04W 72/04; H04W 72/0446; H04L 5/0048; H04L 5/0023; H04L 5/005; H04L 5/0094; H04L 5/0007; H04L 5/0091; H04J 11/00; H04J 11/0069; H04J 2211/005

See application file for complete search history.

(56) References Cited

U.S. PATENT DOCUMENTS

| | | |
|---|---|---|
| 2018/0192383 A1 | 7/2018 | Nam et al. |
| 2018/0241605 A1 | 8/2018 | Luo |
| 2018/0279237 A1 | 9/2018 | Kim et al. |
| 2018/0279241 A1 | 9/2018 | Lee et al. |
| 2019/0349798 A1* | 11/2019 | Lin ........................ H04L 5/0048 |
| 2019/0387412 A1* | 12/2019 | Kim ...................... H04W 56/00 |
| 2020/0029238 A1* | 1/2020 | Si .......................... H04W 24/10 |
| 2020/0336158 A1* | 10/2020 | Uesaka ................. H03M 13/13 |
| 2020/0336260 A1* | 10/2020 | Liu ....................... H04W 84/047 |
| 2020/0351805 A1 | 11/2020 | Kim et al. |
| 2020/0374735 A1* | 11/2020 | Wei ....................... H04L 5/0091 |

FOREIGN PATENT DOCUMENTS

| | | |
|---|---|---|
| WO | 2017/099521 A1 | 6/2017 |
| WO | 2018151539 A1 | 8/2018 |

OTHER PUBLICATIONS

Qualcomm Incorporated, "SS burst set composition consideration", R1-1711136, 3GPP TSG-RAN WG1 Ad-Hoc#2, Qingdao, P.R. China, Jun. 17, 2017.

Samsung, "On SS/PBCH Block Transmissions", R1-1714579, 3GPP TSG RAN WG1#90, Prague, Czech Republic, Aug. 17, 2017.

* cited by examiner

□ : positions in which DRS is actually transmitted

US 11,985,612 B2

METHOD AND APPARATUS FOR TRANSMITTING AND RECEIVING SIGNAL INCLUDING CELL INFORMATION IN COMMUNICATION SYSTEM

TECHNICAL FIELD

The present invention relates to techniques for transmitting and receiving a signal including cell information, and more particularly, to techniques for transmitting and receiving a synchronization signal/physical broadcast channel (SS/PBCH) block in a communication system.

BACKGROUND ART

With the development of information and communication technology, various wireless communication technologies are being developed. Typical wireless communication technologies include long term evolution (LTE), new radio (NR), etc. defined in the 3$^{rd}$ generation partnership project (3GPP) standard. The LTE may be one of fourth generation (4G) wireless communication technologies, and the NR may be one of fifth generation (5G) wireless communication technologies.

The 5G communication system (hereinafter, a NR communication system) using a higher frequency band (e.g., a frequency band of 6 GHz or higher) than a frequency band (e.g., a frequency band lower below 6 GHz) of the 4G communication system is being considered for processing of soaring wireless data after commercialization of the 4G communication system (e.g., communication system supporting the LTE). The 5G communication system may support enhanced Mobile BroadBand (eMBB), Ultra Reliable Low Latency Communication (URLLC), massive Machine Type Communication (mMTC), and the like.

The 5G communication systems may operate in an unlicensed band as well as a licensed band. The base station may transmit a synchronization signal/physical broadcast channel (SS/PBCH) block including cell information using one or more synchronization signal blocks (SSBs) candidates among a plurality of SSB candidates. The SS/PBCH blocks may be transmitted in a beam sweeping manner, and the SS/PBCH blocks transmitted through the same beam (e.g., SS/PBCH blocks having the same beam index) may include the same information. If the SS/PBCH blocks having the same beam index are combined in a terminal, the reception performance of the SS/PBCH block may be improved. However, when the terminal does not know the beams in which the SS/PBCH blocks are transmitted, the terminal cannot combine the SS/PBCH blocks.

DISCLOSURE

Technical Problem

The present invention is directed to providing a method and an apparatus for transmitting and receiving a synchronization signal/physical broadcast channel (SS/PBCH) block in a communication system.

Technical Solution

An operation method of a terminal in a communication system, according to a first exemplary embodiment of the present invention for achieving the above-described objective, may comprise receiving a first synchronization signal/physical broadcast channel (SS/PBCH) block from a base station; receiving a second SS/PBCH block from the base station after receiving the first SS/PBCH block; and when a transmission beam of the first SS/PBCH block is equal to a transmission beam of the second SS/PBCH block, identifying information included in the first SS/PBCH block and the second SS/PBCH block by performing a combining operation on the first SS/PBCH block and the second SS/PBCH block.

Here, the operation method may further comprise receiving a radio resource control (RRC) message including configuration information of an SS/PBCH block measurement timing configuration (SMTC) window from the base station, wherein the first SS/PBCH block and the second SS/PBCH block are received within the SMTC window indicated by the RRC message.

Here, when the transmission beam of the first SS/PBCH block is equal to the transmission beam of the second SS/PBCH block, the first SS/PBCH block and the second SS/PBCH block may be assumed to have a quasi-co-located (QCL) relationship.

Here, each of the transmission beam of the first SS/PBCH block and the transmission beam of the second SS/PBCH block may be calculated based on an equation P=A (modulo) Q. When P is the transmission beam of the first SS/PBCH block, A may be an index of the first SS/PBCH block or an initialization value of a PBCH demodulation reference signal (DMRS) sequence for the first SS/PBCH block, and Q or a range of Q may be a value preconfigured by the base station. When P is the transmission beam of the second SS/PBCH block, A may be an index of the second SS/PBCH block or an initialization value of a PBCH DMRS sequence for the second SS/PBCH block, and Q or a range of Q may be a value preconfigured by the base station.

Here, Q may be a number of SS/PBCH blocks actually transmitted from the base station or a number of beams used for transmission of the SS/PBCH blocks.

Here, when the range of Q is preconfigured by the base station, Q applied to the equation may be selected by the terminal within the range of Q.

Here, an index of the first SS/PBCH block may be determined based on an initialization value of a PBCH DMRS sequence for the first SS/PBCH block or a combination of the initialization value of the PBCH DMRS sequence for the first SS/PBCH block and a value indicated by a PBCH payload included in the first SS/PBCH block, and an index of the second SS/PBCH block may be determined based on an initialization value of a PBCH DMRS sequence for the second SS/PBCH block or a combination of the initialization value of the PBCH DMRS sequence for the second SS/PBCH block and a value indicated by a PBCH payload included in the second SS/PBCH block.

Here, when transmission of the first SS/PBCH block is delayed, the first SS/PBCH block may include information indicating an offset between an original transmission position and an actual transmission position of the first SS/PBCH block.

An operation method of a base station in a communication system, according to a second exemplary embodiment of the present invention for achieving the above-described objective, may comprise transmitting a first synchronization signal/physical broadcast channel (SS/PBCH) block using a first beam; transmitting a second SS/PBCH block using a second beam; and transmitting a third SS/PBCH block using the first beam, wherein the first SS/PBCH block and the third SS/PBCH block transmitted using the same first beam include same information, and information included in each of the first SS/PBCH block and the third SS/PBCH block is different from information included in the second SS/PBCH block transmitted through the second beam different from the first beam.

Here, the operation method may further comprise transmitting a radio resource control (RRC) message including configuration information of an SS/PBCH block measurement timing configuration (SMTC) window, wherein the first SS/PBCH block, the second SS/PBCH block and the third SS/PBCH block are transmitted within the SMTC window indicated by the RRC message.

Here, when a transmission beam of the first SS/PBCH block is equal to a transmission beam of the third SS/PBCH block, the first SS/PBCH block and the third SS/PBCH block may have a quasi-co-located (QCL) relationship.

Here, each of the first beam and the second beam may be calculated based on an equation P=A (modulo) Q. When P is the first beam used for transmission of the first SS/PBCH block, A may be an index of the first SS/PBCH block or an initialization value of a PBCH demodulation reference signal (DMRS) sequence for the first SS/PBCH block, and Q may be a value preconfigured by the base station. When P is the second beam used for transmission of the second SS/PBCH block, A may be an index of the second SS/PBCH block or an initialization value of a PBCH DMRS sequence for the second SS/PBCH block, and Q may be a value preconfigured by the base station. When P is the first beam used for transmission of the third SS/PBCH block, A may be an index of the third SS/PBCH block or an initialization value of a PBCH DMRS sequence for the third SS/PBCH block, and Q may be a value preconfigured by the base station.

Here, Q may be a number of SS/PBCH blocks actually transmitted from the base station or a number of beams used for transmission of the SS/PBCH blocks.

Here, when transmission of the first SS/PBCH block is delayed, the first SS/PBCH block may include information indicating an offset between an original transmission position and an actual transmission position of the first SS/PBCH block.

A terminal in a communication system, according to a third exemplary embodiment of the present invention for achieving the above-described objective, may comprise a processor and a memory storing at least one instruction executable by the processor. When executed by the processor, the at least one instruction may be configured the processor to receive a first synchronization signal/physical broadcast channel (SS/PBCH) block from a base station; receive a second SS/PBCH block from the base station after receiving the first SS/PBCH block; and when a transmission beam of the first SS/PBCH block is equal to a transmission beam of the second SS/PBCH block, identify information included in the first SS/PBCH block and the second SS/PBCH block by performing a combining operation on the first SS/PBCH block and the second SS/PBCH block.

Here, the at least one instruction may be further configured the processor to receive a radio resource control (RRC) message including configuration information of an SS/PBCH block measurement timing configuration (SMTC) window from the base station, wherein the first SS/PBCH block and the second SS/PBCH block are received within the SMTC window indicated by the RRC message.

Here, when the transmission beam of the first SS/PBCH block is equal to the transmission beam of the second SS/PBCH block, the first SS/PBCH block and the second SS/PBCH block may be assumed to have a quasi-co-located (QCL) relationship.

Here, each of the transmission beam of the first SS/PBCH block and the transmission beam of the second SS/PBCH block may be calculated based on an equation P=A (modulo) Q. When P is the transmission beam of the first SS/PBCH block, A may be an index of the first SS/PBCH block or an initialization value of a PBCH demodulation reference signal (DMRS) sequence for the first SS/PBCH block, and Q or a range of Q may be a value preconfigured by the base station. When P is the transmission beam of the second SS/PBCH block, A may be an index of the second SS/PBCH block or an initialization value of a PBCH DMRS sequence for the second SS/PBCH block, and Q or a range of Q may be a value preconfigured by the base station.

Here, Q may be a number of SS/PBCH blocks actually transmitted from the base station or a number of beams used for transmission of the SS/PBCH blocks.

Here, when transmission of the first SS/PBCH block is delayed, the first SS/PBCH block may include information indicating an offset between an original transmission position and an actual transmission position of the first SS/PBCH block.

Advantageous Effects

According to the present invention, the base station can transmit a plurality of synchronization signal/physical broadcast channel (SS/PBCH) blocks using one or more beams. The SS/PBCH blocks transmitted through the same beam may include the same information. The terminal can receive a plurality of SS/PBCH blocks from the base station, and can identify indexes of beams used for transmission of the plurality of SS/PBCH blocks based on an index of each SS/PBCH block (or, a PBCH demodulation reference signal (DMRS) sequence initialization value of the corresponding SS/PBCH block) and a value (e.g., the number of actually-transmitted SS/PBCH blocks or the number of beams used for transmission of the SS/PBCH blocks) preconfigured by the base station. The terminal can perform a combining operation on the SS/PBCH blocks having the same beam index, and obtain information from the combined SS/PBCH blocks. Accordingly, the performance of the communication system can be improved.

MODES OF THE INVENTION

Figure 1:
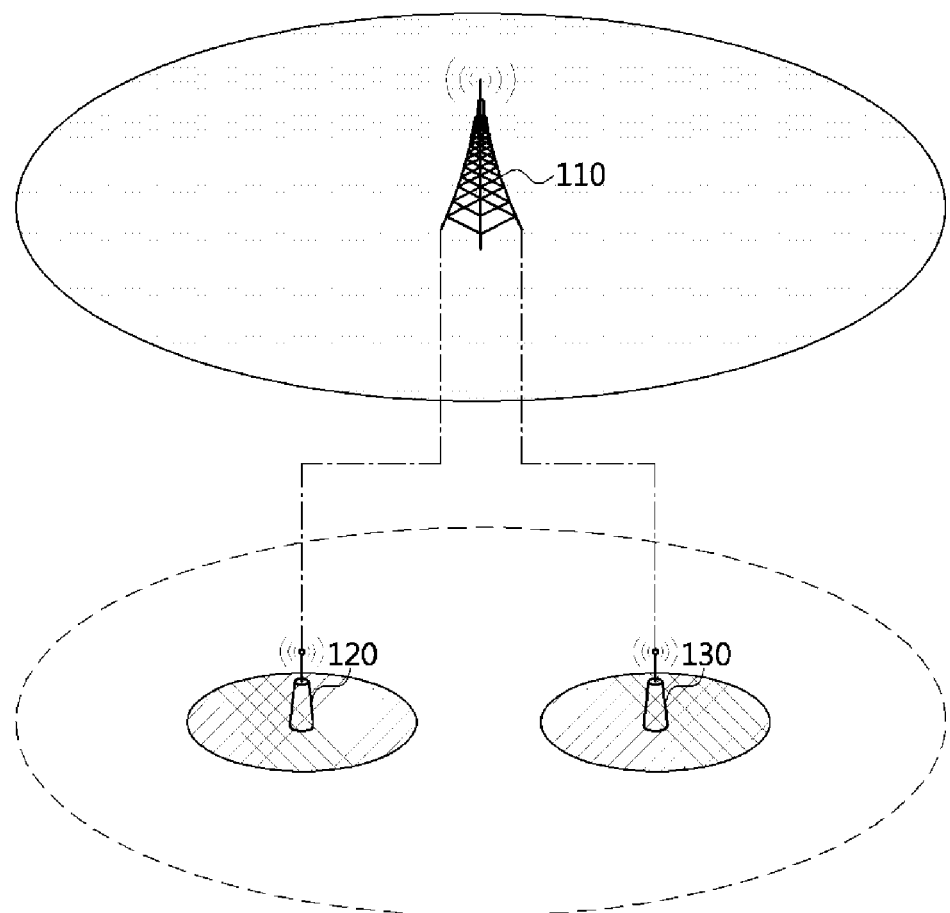
FIG. 1 is a conceptual diagram illustrating a first exemplary embodiment of a wireless communication network.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A wireless communication network to which exemplary embodiments according to the present disclosure will be described. However, the wireless communication network to which exemplary embodiments according to the present disclosure are applied are not restricted to what will be described below. That is, the exemplary embodiments according to the present disclosure may be applied to various wireless communication networks. Here, the term 'wireless communication network' may be used with the same meaning as the term 'wireless communication system'.

FIG. 1 is a conceptual diagram illustrating a first exemplary embodiment of a wireless communication network.

Referring to FIG. 1, a first base station 110 may support a cellular communication (e.g., long term evolution (LTE), LTE-advance (LTE-A), LTE-unlicensed (LTE-U), new radio (NR), NR-unlicensed (NR-U), etc. specified in the $3^{rd}$ generation partnership project (3GPP)), or the like. The first base station 110 may support multiple input multiple output (MIMO) (e.g., single-user MIMO (SU-MIMO), multi-user MIMO (MU-MIMO), massive MIMO, etc.), coordinated multipoint (CoMP), carrier aggregation (CA), or the like.

The first base station 110 may operate in a frequency band F1 and may form a macro cell. The first base station 110 may be connected to another base station (e.g., second base station 120, third base station 130, etc.) through an ideal backhaul or a non-ideal backhaul. The second base station 120 may be located within the coverage of the first base station 110. The second base station 120 may operate in a frequency band F2 and may form a small cell. The communication scheme (e.g., NR) supported by the second base station 120 may be different from the communication scheme of the first base station 110.

The third base station 130 may be located within the coverage of the first base station 110. The third base station 130 may operate in the frequency band F2 and may form a small cell. The communication scheme (e.g., NR) supported by the third base station 120 may be different from the communication scheme of the first base station 110. Each of the first base station 110 and a user equipment (UE) (not shown) connected to the first base station 110 may transmit and receive signals through a carrier aggregation (CA) between the frequency band F1 and the frequency band F2. Alternatively, each of the UE connected to the first base station 110 and the first base station 110 may support dual-connectivity (DC) for the frequency band F1 and the frequency band F2, and may transmit and receive signals in the DC environment.

The communication node (i.e., base station, UE, etc.) constituting the wireless communication network described above may supporting a code division multiple access (CDMA) based communication protocol, a wideband CDMA (WCDMA) based communication protocol, a time division multiple access (TDMA) based communication protocol, a frequency division multiple access (FDMA) based communication protocol, a single carrier-FDMA (SC-FDMA) based communication protocol, an orthogonal frequency division multiplexing (OFDM) based communication protocol, an orthogonal frequency division multiple access (OFDMA) based communication protocol, or the like.

Among the communication nodes, the base station may be referred to as a Node B, an evolved Node B, a 5G Node B (gNodeB), a base transceiver station (BTS), a radio base station, a radio transceiver, an access point, an access node, a transmission/reception point (Tx/Rx Point), or the like. Among the communication nodes, the UE may be referred to as a terminal, an access terminal, a mobile terminal, a station, a subscriber station, a portable subscriber station, a mobile station, a node, a device, or the like. The communication node may have the following structure.

Figure 2:
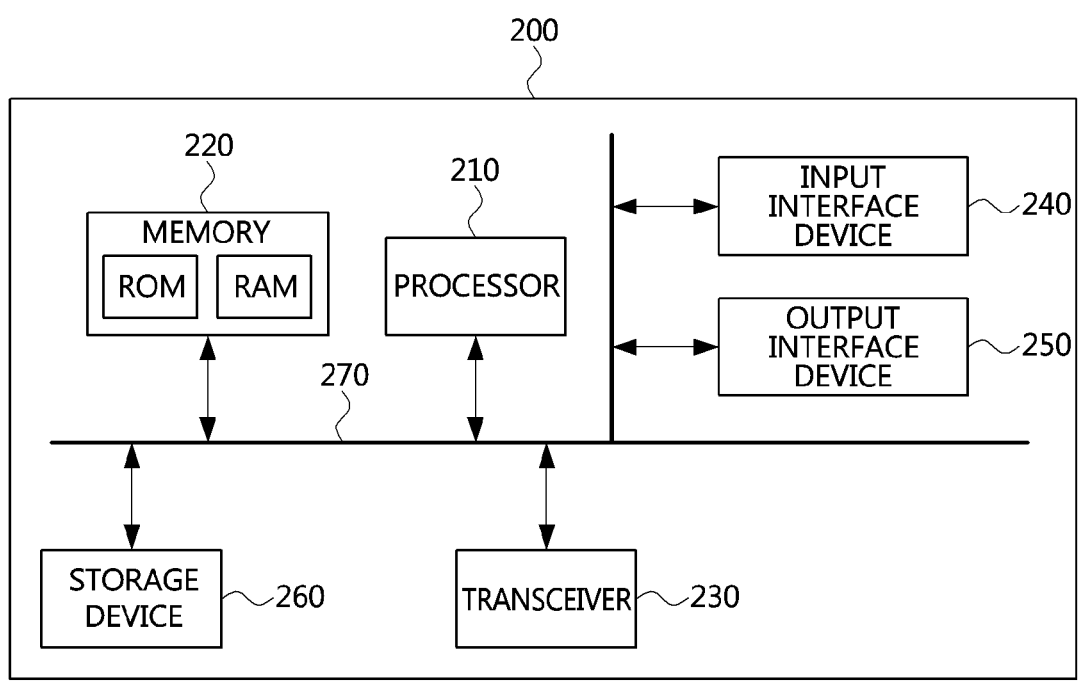
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Hereinafter, operation methods of a communication node in a wireless communication network will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE is described, a corresponding base station may perform an operation corresponding to the operation of the UE. Conversely, when an operation of the base station is described, the corresponding UE may perform an operation corresponding to the operation of the base station.

Figure 3:
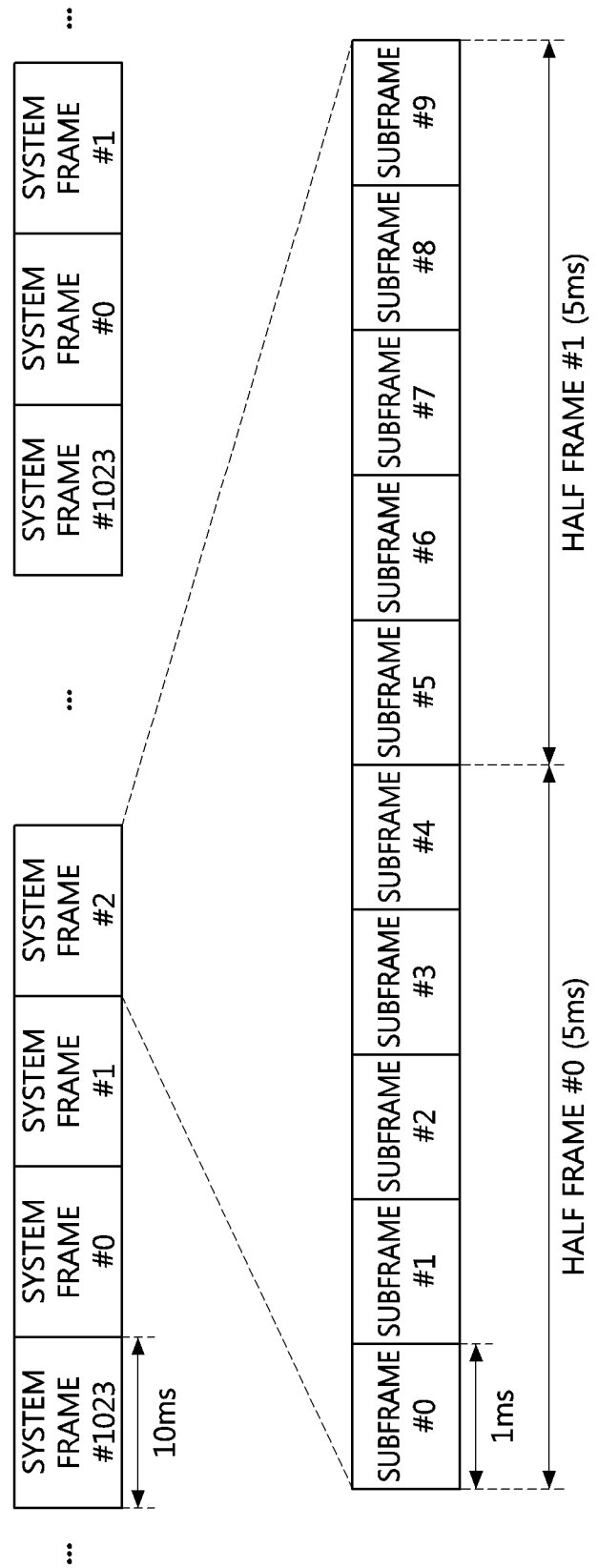
FIG. 3 is a conceptual diagram illustrating a first exemplary embodiment of a system frame in a wireless communication network.

FIG. 3 is a conceptual diagram illustrating a first exemplary embodiment of a system frame in a wireless communication network.

Referring to FIG. 3, time resources in a wireless communication network may be divided into frames. For example, system frames each of which has a length of 10 milliseconds (ms) may be configured consecutively in the time axis of the wireless communication network. System frame numbers (SFNs) may set to #0 to #1023. In this case, 1024 system frames may be repeated in the time axis of the wireless communication network. For example, an SFN of a system frame after the system frame #1023 may be set to #0.

One system frame may comprise two half frames, and the length of one half frame may be 5 ms. A half frame located in a starting region of a system frame may be referred to as a 'half frame #0', and a half frame located in an ending region of the system frame may be referred to as a 'half frame #1'. The system frame may include 10 subframes, and the length of one subframe may be 1 ms. 10 subframes within one system frame may be referred to as 'subframes #0 to #9'.

Figure 4:
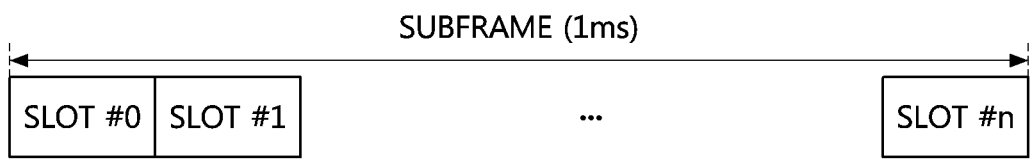
FIG. 4 is a conceptual diagram illustrating a first exemplary embodiment of a subframe in a wireless communication network.

FIG. 4 is a conceptual diagram illustrating a first exemplary embodiment of a subframe in a wireless communication network.

Referring to FIG. 4, one subframe may include n slots, and n may be an integer of 1 or more. Accordingly, one subframe may be composed of one or more slots.

Figure 5:
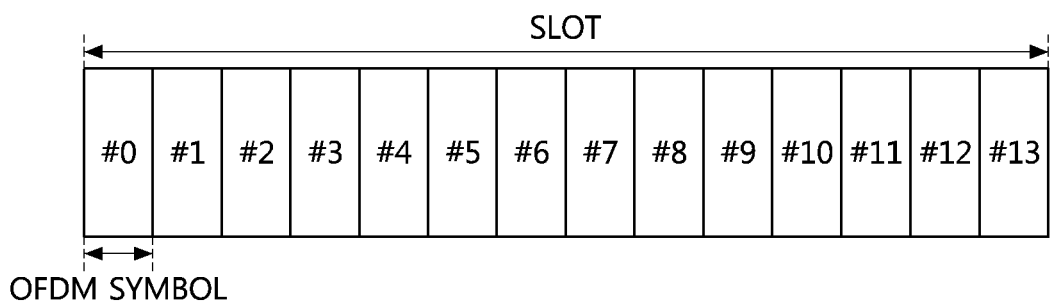
FIG. 5 is a conceptual diagram illustrating a first exemplary embodiment of a slot in a wireless communication network.
Figure 6:
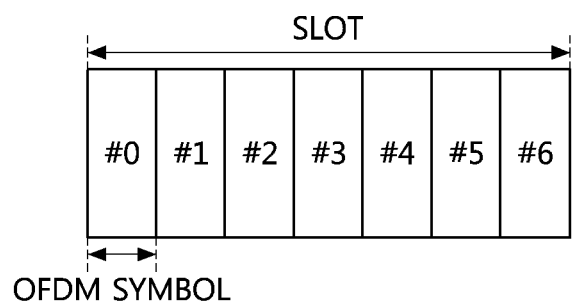
FIG. 6 is a conceptual diagram illustrating a second exemplary embodiment of a slot in a wireless communication network.

FIG. 5 is a conceptual diagram illustrating a first exemplary embodiment of a slot in a wireless communication network, and FIG. 6 is a conceptual diagram illustrating a second exemplary embodiment of a slot in a wireless communication network.

Referring to FIG. 5 and FIG. 6, one slot may comprise one or more OFDM symbols. For example, one slot shown in FIG. 5 may be composed of 14 OFDM symbols. One slot shown in FIG. 6 may be composed of 7 OFDM symbols. Here, the length of the slot may vary depending on the number of OFDM symbols included in the slot and the length of the OFDM symbol. Alternatively, the length the slot may vary according to a numerology. When a subcarrier spacing is 15 kHz (e.g., $\mu=0$), the length of the slot may be 1 ms. In this case, one system frame may include 10 slots. When the subcarrier spacing is 30 kHz (e.g., $\mu=1$), the length of the slot length may be 0.5 ms. In this case, one system frame may include 20 slots.

When the subcarrier spacing is 60 kHz (e.g., $\mu=2$), the length of the slot length may be 0.25 ms. In this case, one system frame may include 40 slots. When the subcarrier spacing is 120 kHz (e.g., $\mu=3$), the length of the slot length may be 0.125 ms. In this case, one system frame may include 80 slots. When the subcarrier spacing is 240 kHz (e.g., $\mu=4$), the length of the slot length may be 0.0625 ms. In this case, one system frame may include 160 slots.

The symbol may be configured as a downlink (DL) symbol, a flexible symbol, or an uplink (UL) symbol. A slot composed only of DL symbols may be referred to as 'DL slot', a slot composed only of FL symbols may be referred to as 'FL slots', and a slot composed only of UL symbols may be referred to as 'UL slot'.

Figure 7:
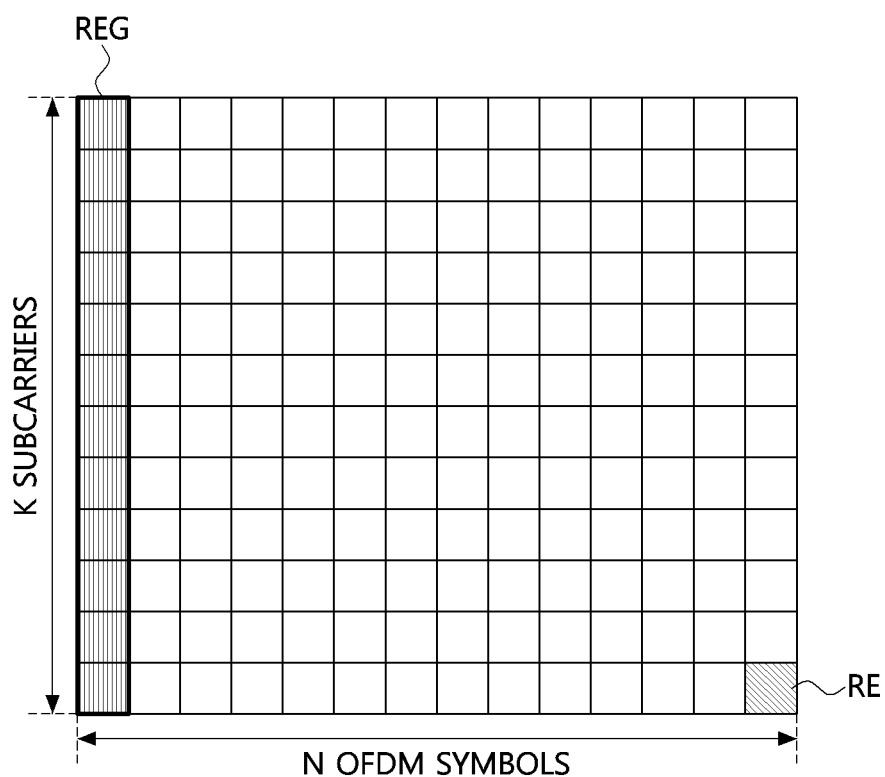
FIG. 7 is a conceptual diagram illustrating a first exemplary embodiment of time-frequency resources in a wireless communication network.

FIG. 7 is a conceptual diagram illustrating a first exemplary embodiment of time-frequency resources in a wireless communication network.

Referring to FIG. 7, a resource configured with one OFDM symbol in the time axis and one subcarrier in the frequency axis may be defined as a 'resource element (RE)'. Resources configured with one OFDM symbol in the time axis and K subcarriers in the frequency axis may be defined as a 'resource element group (REG)'. One REG may include K REs. The REG may be used as a basic unit of resource allocation in the frequency axis. K may be a natural number. Here, K may be 12. N may be a natural number. N in the slot shown in FIG. 5 may be 14, and N in the slot shown in FIG. 6 may be 7. The N OFDM symbols may be used as a basic unit of resource allocation in the time axis.

Hereinafter, methods for transmitting and receiving signals between a base station and a terminal will be described. Here, the signals may be one or more of a synchronization signal, system information, control information, user data, and a reference signal. The base station may transmit common information for a cell (e.g., cell formed by the base station) to terminals in the cell. The common information may be common system information and/or common control information. The common information may be transmitted in a broadcast manner to the terminals in the cell, and a channel used for transmitting and receiving the common information may be referred to as a 'physical broadcast channel (PBCH)'. Here, a channel may refer to a physical time-frequency resource. Alternatively, a channel may be interpreted as a message that includes information, data, and/or signals.

The base station may transmit a synchronization signal with the PBCH to the terminals in the cell in a broadcast manner. The synchronization signal may be used to acquire time synchronization of the cell. A set of the synchronization signal and the PBCH may be referred to as a 'synchronization signal block (SSB)' or 'SS/PBCH block'. The synchronization signal may include a primary synchronization signal (PSS) and a secondary synchronization signal (SSS), and the SS/PBCH block may further include a PBCH demodulation reference signal (DMRS) used for demodulation of the PBCH.

A time interval for receiving the SS/PBCH block transmitted from the base station may be configured for the terminal. The time interval for receiving the SS/PBCH block may be referred to as an 'SS/PBCH block measurement timing configuration (SMTC) window'. The base station may transmit information on a duration, a periodicity, and an offset of the SMTC window to the terminal through a radio resource control (RRC) message (e.g., higher layer signaling). The terminal may obtain the information on the duration, periodicity, and offset of the SMTC window by receiving the RRC message, and may identify the SMTC window based on the information on the duration, periodicity, and offset of the SMTC window. For example, the base station and the terminal may identify a system frame satisfying Equations 1 to 3 below and a subframe belonging to the system frame by using the periodicity and offset of the SMTC window, and may configure the identified subframe as a starting time point of the SMTC window. In Equations 1 to 3, 'periodicity' may be the periodicity of the SMTC window, and 'offset' may be the offset of the SMTC window.

$$\text{System Frame Number(modulo)}T = \text{Floor}\left(\text{Offset}/10\right)(\text{modulo})T \quad \text{[Equation 1]}$$

$$T = \text{periodicity}/10 \quad \text{[Equation 2]}$$

$$\begin{aligned}\text{Subframe Number} &= \text{Offset(modulo)}10 \quad \text{[Equation 3]}\\ &\quad (\text{periodicity} > 5 \text{ subframes})\\ &= \text{Offset or Offset} + 5\\ &\quad (\text{periodicity} <= 5 \text{ subframes})\end{aligned}$$

The base station may configure the SMTC window starting from the subframe within the system frame satisfying Equations 1 to 3. The terminal may receive the SS/PBCH block within the SMTC window configured by the base station. The duration of the SMTC window may be 5 ms (e.g., 5 subframes).

Figure 8:
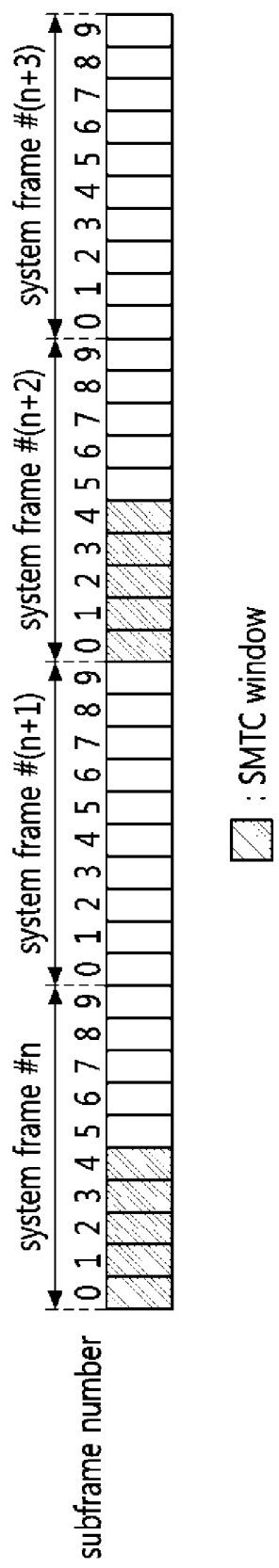
FIG. 8 is a conceptual diagram illustrating a first exemplary embodiment of an SMTC window in a wireless communication network.

FIG. 8 is a conceptual diagram illustrating a first exemplary embodiment of an SMTC window in a wireless communication network.

Referring to FIG. 8, a periodicity of the SMTC window may be 20 subframes. In this case, the SMTC window may be configured every two system frames. The offset of the SMTC window may be 0. In this case, the starting time point of the SMTC window may be the first subframe (e.g., subframe #0) in the system frame. The duration of the SMTC window may be configured variously. The base station may transmit the SS/PBCH block within the SMTC window.

Figure 9:
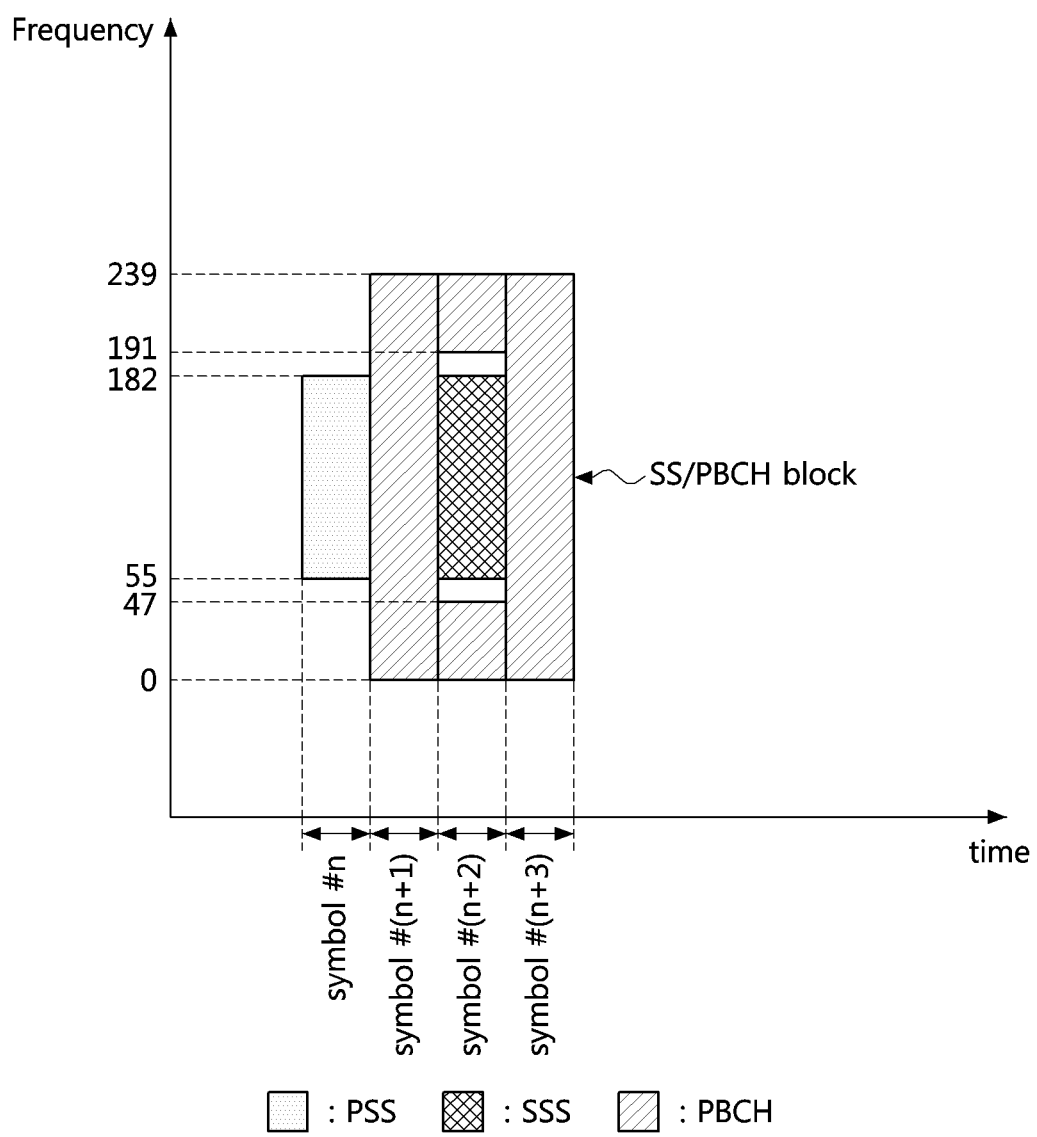
FIG. 9 is a conceptual diagram illustrating a first exemplary embodiment of an SS/PBCH block in a wireless communication network.

FIG. 9 is a conceptual diagram illustrating a first exemplary embodiment of an SS/PBCH block in a wireless communication network.

Referring to FIG. 9, an SS/PBCH block may be configured with four symbols in the time axis. The PSS included in the SS/PBCH block may be configured in the first symbol (e.g., symbol #n) among the four symbols. The SSS included in the SS/PBCH block may be configured in the third symbol (e.g., symbol #(n+2)) among the four symbols. The PBCH included in the SS/PBCH block may be configured in the second symbol (e.g., symbol #(n+1)), the third symbol (e.g., symbol #(n+2)), and the fourth symbol (e.g., symbol #(n+3)) among the four symbols. The position in which the SS/PBCH block can be transmitted may be preconfigured as follows.

Figure 10:
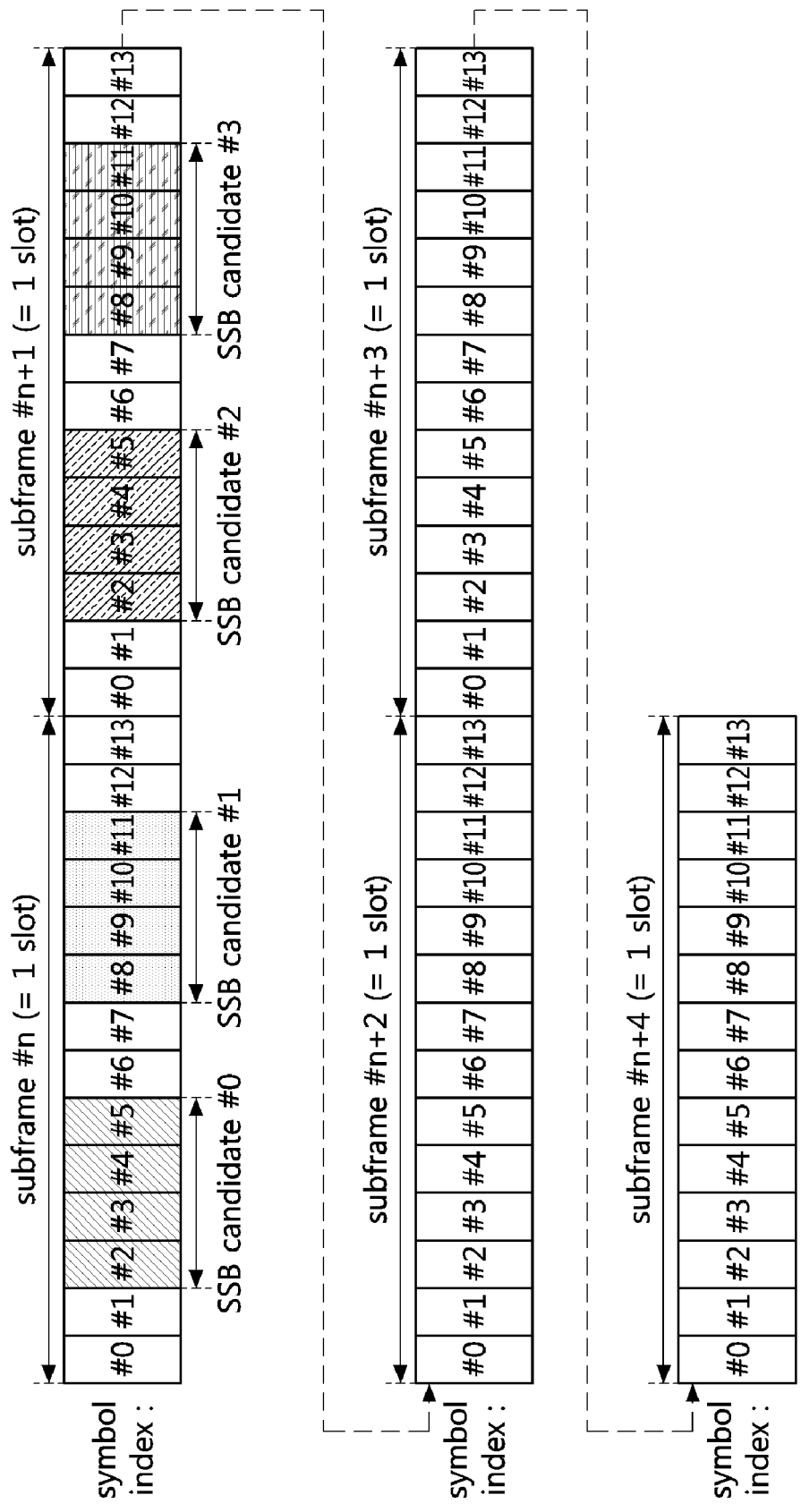
FIG. 10 is a conceptual diagram illustrating a first exemplary embodiment of positions in which SS/PBCH blocks can be transmitted in a wireless communication network.

FIG. 10 is a conceptual diagram illustrating a first exemplary embodiment of positions in which SS/PBCH blocks can be transmitted in a wireless communication network.

Referring to FIG. 10, four positions in which the SS/PBCH blocks can be transmitted may be provided within one half frame. For example, the positions in which the SS/PBCH blocks can be transmitted may be SSB candidates #0 to #3. The SSB candidate may be a resource in which the SS/PBCH block can be transmitted. One half frame may comprise 5 subframes (e.g., subframes #n to #(n+4)). Each of the subframes may include one slot, and each of the slots may include 14 symbols.

In this case, the positions in which the SS/PBCH blocks can be transmitted may exist in the subframes #n and #(n+1). In the subframe #n, the SS/PBCH block may be transmitted through symbols #2 to #5 and/or symbols #8 to #11. The SS/PBCH block may be transmitted on one or more SSB candidates among the SSB candidates #0 to #3. The SS/PBCH block transmitted through each of the SSB candidates #0 to #3 may have a different SS/PBCH block index.

An index of the SS/PBCH block transmitted in the SSB candidate #0 of the subframe #n may be 0. An index of the SS/PBCH block transmitted in the SSB candidate #1 of the subframe #n may be 1. An index of the SS/PBCH block transmitted in the SSB candidate #2 of the subframe #(n+1) may be 2. An index of the SS/PBCH block transmitted in the SSB candidate #3 of the subframe #(n+1) may be 3.

Also, the SS/PBCH block transmitted through each of the SSB candidates #0 to #3 may be transmitted through a different beam. For example, in the SSB candidate #0 of the subframe #n, the SS/PBCH block may be transmitted using a beam #0. In the SSB candidate #1 of the subframe #n, the SS/PBCH block may be transmitted using a beam #1. In the SSB candidate #2 of the subframe #(n+1), the SS/PBCH block may be transmitted using a beam #2. In the SSB candidate #3 of the subframe #(n+1), the SS/PBCH block may be transmitted using a beam #3. The SS/PBCH blocks transmitted through different beams may include different information.

The terminal may receive the SS/PBCH block from the base station by performing a monitoring operation on the SSB candidate, and may obtain cell information (e.g., timing information) based on the received SS/PBCH block. To this end, the SS/PBCH block may indicate the index of the corresponding SS/PBCH block. The index of the SS/PBCH block may be indicated by the PBCH DMRS (e.g., an initialization value (iSSB) of a sequence of the PBCH DMRS) of the corresponding SS/PBCH block. Also, the index of the SS/PBCH block may be indicated by a payload (e.g., a field value) of the PBCH included in the corresponding SS/PBCH block. Alternatively, the index of the SS/PBCH block may be indicated by a combination of the PBCH DMRS and the PBCH payload.

Meanwhile, the SMTC window may be configured in the subframes #n to #(n+4) included in the half frame. The terminal may receive the SS/PBCH block within the SMTC window.

Figure 11:
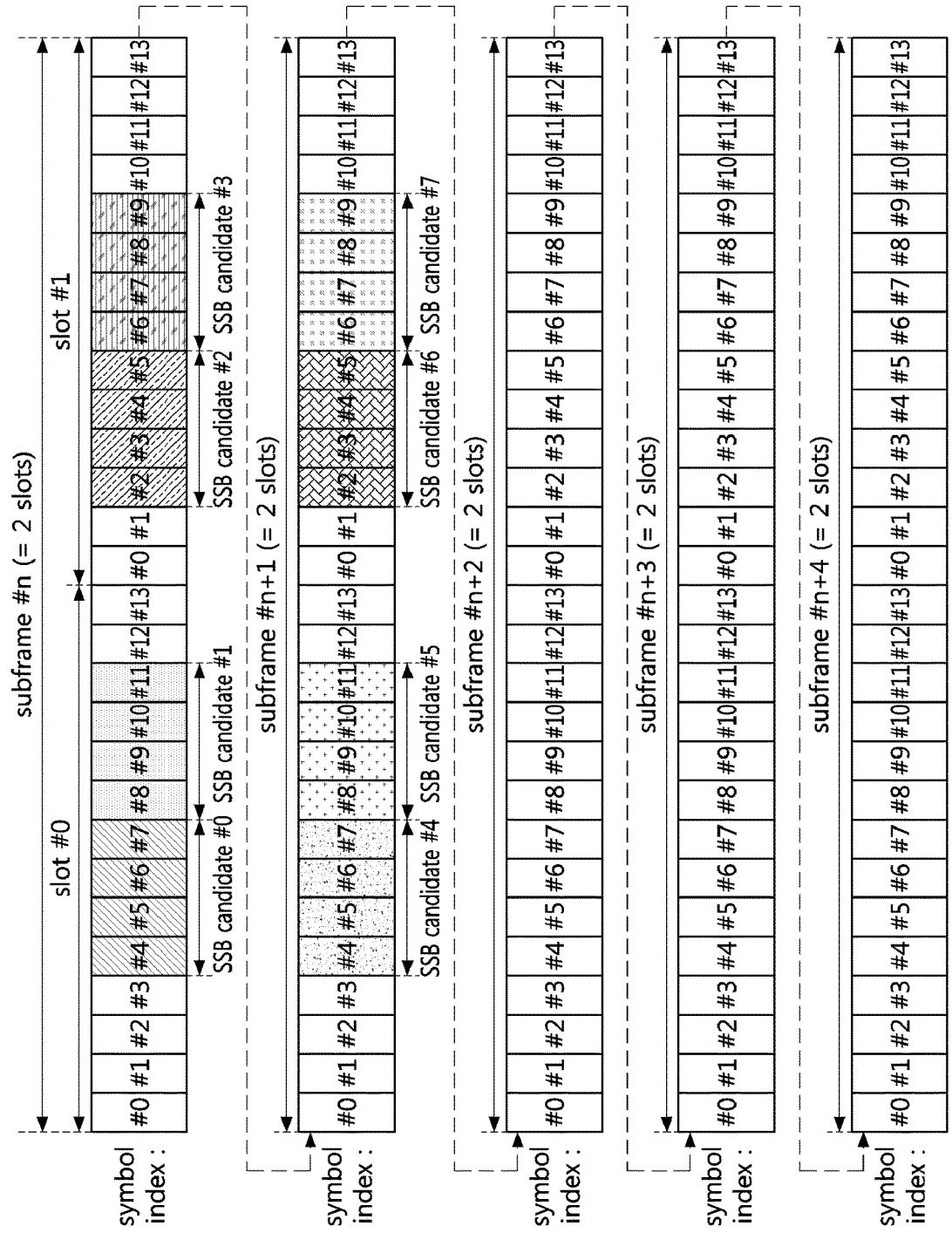
FIG. 11 is a conceptual diagram illustrating a second exemplary embodiment of positions in which SS/PBCH blocks can be transmitted in a wireless communication network.

FIG. 11 is a conceptual diagram illustrating a second exemplary embodiment of positions in which SS/PBCH blocks can be transmitted in a wireless communication network.

Referring to FIG. 11, eight positions in which the SS/PBCH blocks can be transmitted may be provided within one half frame. For example, the positions in which the SS/PBCH blocks can be transmitted may be SSB candidates #0 to #7. The SSB candidate may be a resource in which the SS/PBCH block can be transmitted. One half frame may comprise 5 subframes (e.g., subframes #n to #(n+4)). Each of the subframes may include two slots, and each of the slots may include 14 symbols. In this case, the positions in which the SS/PBCH blocks can be transmitted may exist in the subframes #n and #(n+1).

In the slot #0 of the subframe #n, the SS/PBCH block may be transmitted through symbols #4 to #7 and/or symbols #8 to #11. In the slot #1 of the subframe #n, the SS/PBCH block may be transmitted through symbols #2 to #5 and/or symbols #6 to #9. In the slot #0 of the subframe #(n+1), the SS/PBCH block may be transmitted through symbols #4 to #7 and/or symbols #8 to #11. In the slot #1 of the subframe #(n+1), the SS/PBCH block may be transmitted through symbols #2 to #5 and/or symbols #6 to #9

The SS/PBCH block may be transmitted through one or more SSB candidates among the SSB candidates #0 to #7. The SS/PBCH blocks transmitted in the respective SSB candidates #0 to #7 may have different SS/PBCH block indexes. The index of the SS/PBCH block may increase together with a subframe index (e.g., subframe number), a slot index (e.g., slot number), and/or a symbol index (e.g., symbol number). In addition, the SS/PBCH blocks may be transmitted using different beams in the SSB candidates #0 to #7.

Up to Y SS/PBCH blocks may be transmitted in one half frame according to a subcarrier spacing applied to the wireless communication network. In this case, Y indexes for the Y SS/PBCH blocks may be allocated. The index of the SS/PBCH block may consist of K bits. Each of Y and K may be a natural number. For example, Y may be 4, 8, or 64. The K bits may include M most significant bits (MSBs) and N least significant bits (LSBs). Each of M and N may be a natural number. Each of M and N may be less than K.

The base station may inform the M MSBs and the N LSBs using different schemes. The N LSBs may be indicated by the PBCH DMRS. The N LSBs may be indicated by an initialization value of the PBCH DMRS sequence. The M MSBs may be transmitted through a PBCH payload (e.g., field value). For example, the terminal may obtain the N LSBs constituting the index of the corresponding SS/PBCH block based on the PBCH DMRS sequence. The terminal may obtain the PBCH payload by demodulating and decoding the PBCH, and may obtain the M MSBs constituting the index of the corresponding SS/PBCH block from the PBCH payload.

On the other hand, the base station may configure the SMTC window to be periodical, and may transmit configuration information (e.g., duration, periodicity, offset) of the SMTC window to the terminal. The base station may transmit SS/PBCH block(s) within the SMTC window. When the duration of the SMTC window is 5 ms, the positions in which the SS/PBCH blocks can be transmitted within the SMTC window may be the SSB candidates illustrated in FIG. 10 or the SSB candidates illustrated in FIG. 11.

For example, the base station may configure the SMTC window illustrated in FIG. 8, and transmit configuration information of the SMTC window to the terminal. The base station may transmit the SS/PBCH block illustrated in FIG. 9 within the SMTC window illustrated in FIG. 8. The positions in which the SS/PBCH blocks can be transmitted within the SMTC window may be the SSB candidates illustrated in FIG. 10 or the SSB candidates illustrated in FIG. 11.

The terminal may receive the configuration information of the SMTC window from the base station, and may determine that the SMTC window is configured as in the exemplary embodiment illustrated in FIG. 8 based on the configuration information of the SMTC window. Also, the terminal may determine that the positions in which the SS/PBCH blocks can be transmitted in the system frame #n of FIG. 8 are the SSB candidates illustrated in FIG. 10 or the SSB candidates illustrated in FIG. 11. The terminal may determine that the positions in which the SS/PBCH blocks can be transmitted in the system frame #(n+2) of FIG. 8 are the SSB candidates illustrated in FIG. 10 or the SSB candidates illustrated in FIG. 11. Referring to the exemplary embodiments of FIGS. 8 and 11, the indexes of 8 SS/PBCH blocks transmitted in the system frame #n may be #0 to #7, and the indexes of 8 SS/PBCH blocks transmitted in the system frame #(n+2) may be #0 to #7.

The SS/PBCH blocks having the same index may be transmitted using the same beam, and the SS/PBCH blocks having different indexes may be transmitted using different beams. The SS/PBCH blocks transmitted through the same beam may include the same information, and the SS/PBCH blocks transmitted through different beams may include different information.

When the SS/PBCH blocks received in different SMTC windows have the same index, the terminal may assume that the SS/PBCH blocks having the same index have a quasi-co-located (QCL) relationship with each other. In this case, the terminal may perform a combining (e.g., soft combining) operation on the SS/PBCH blocks having the same index. Here, the index of the SS/PBCH block transmitted in the SSB candidate #0 of the system frame #n may be the same as the index of the SS/PBCH block transmitted in the SSB candidate #0 of the system frame #(n+2). The SS/PBCH blocks transmitted through the SSB candidates having the same index in different system frames (e.g., different SMTC windows) may have the same index.

Alternatively, when the sequence indexes of the PBCH DMRSs (e.g., initialization values (iSSBs) of the PBCH DMRS sequences) for the SS/PBCH blocks received in the different SMTC windows are the same, the terminal may assume that the corresponding SS/PBCH blocks have a QCL relationship with each other. Accordingly, the terminal may perform a soft combining operation on the SS/PBCH blocks having the same sequence index of the PBCH DMRS.

Meanwhile, the base station may not transmit the SS/PBCH block in the SSB candidate within the SMTC window. For example, when a time interval is occupied by another communication node in an unlicensed band, the base station may not transmit a signal in the corresponding time interval. Therefore, when an SSB candidate is occupied by another communication node in the unlicensed band, the base station may not transmit the SS/PBCH block in the corresponding SSB candidate. If the terminal does not receive the SS/PBCH block, problems may occur in a radio resource management (RRM) measurement procedure, a synchronization acquisition procedure, and a channel estimation procedure. Therefore, when the base station fails to transmit the SS/PBCH block in a specific SSB candidate, the base station may transmit the SS/PBCH block in another SSB candidate (e.g., a reserved SSB candidate).

Figure 12:
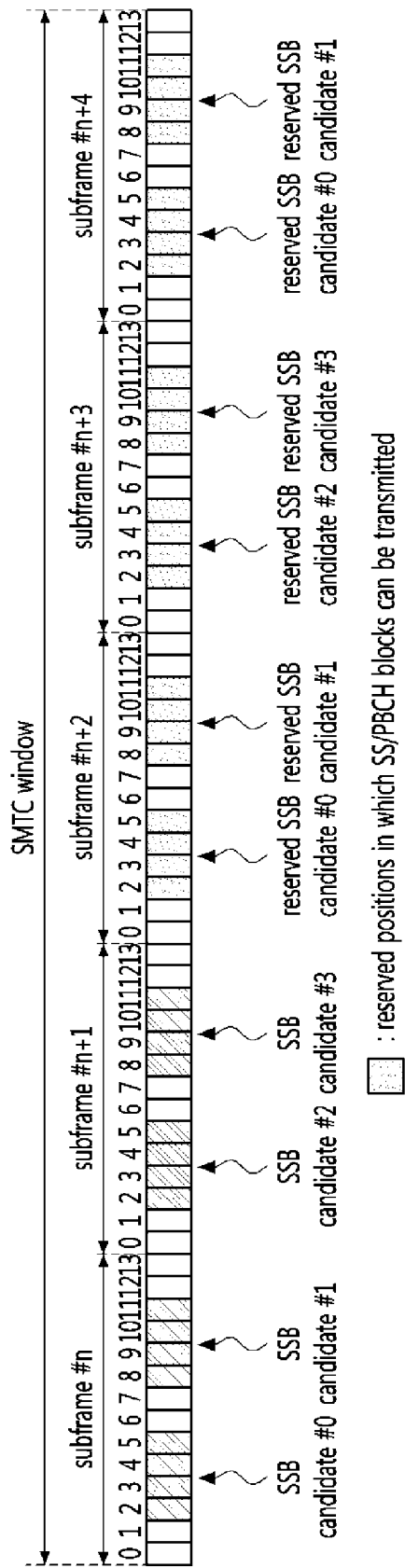
FIG. 12 is a conceptual diagram illustrating a third exemplary embodiment of positions in which SS/PBCH blocks can be transmitted in a wireless communication network.

FIG. 12 is a conceptual diagram illustrating a third exemplary embodiment of positions in which SS/PBCH blocks can be transmitted in a wireless communication network.

Referring to FIG. 12, SSB candidates (e.g., existing SSB candidates) may be configured in subframes #n and #(n+1) within the SMTC window, and reserved SSB candidates may be configured in subframes #(n+2) to #(n+4) within the SMTC window. The base station may attempt to transmit SS/PBCH blocks in the SSB candidates in the subframes #n and #(n+1). When the SS/PBCH block is not transmitted in the SSB candidates in the subframes #n and #(n+1), the base station may attempt to transmit SS/PBCH blocks in the reserved SSB candidates in the subframes #(n+2) to #(n+4).

The positions of the reserved SSB candidates in the subframe may be configured to be the same as those of the existing SSB candidates. For example, the positions of the reserved SSB candidates (e.g., symbols #2 to #5, symbols #8 to #11) in each of the subframes #(n+2) to #(n+4) may be configured to be identical to the positions of the SSB candidates (e.g., symbols #2 to #5, symbols #8 to #11) in each of the subframes #n and #(n+1).

The reserved SSB candidate(s) may be preconfigured. The reserved SSB candidates within the SMTC window may be repeated in the remaining subframes #(n+2) to #(n+4) in the same form as the existing SSB candidates (e.g., the SSB candidates in the subframes #n and #(n+1)). For example, an SS/PBCH block #0 may be transmitted in a reserved SSB candidate #0 of the subframe #(n+2), and an SS/PBCH block #1 may be transmitted in a reserved SSB candidate #1 of the subframe #(n+2). An SS/PBCH block #2 may be transmitted in a reserved SSB candidate #2 of the subframe #(n+3), and an SS/PBCH block #3 may be transmitted in a reserved SSB candidate #3 of the subframe #(n+3). An SS/PBCH block #0 may be transmitted in a reserved SSB candidate #0 of the subframe #(n+4), and an SS/PBCH block #1 may be transmitted in a reserved SSB candidate #1 of the subframe #(n+4). Here, the SS/PBCH block #i may be an SS/PBCH block having an index i. n may be an integer equal to or greater than 0.

Figure 13:
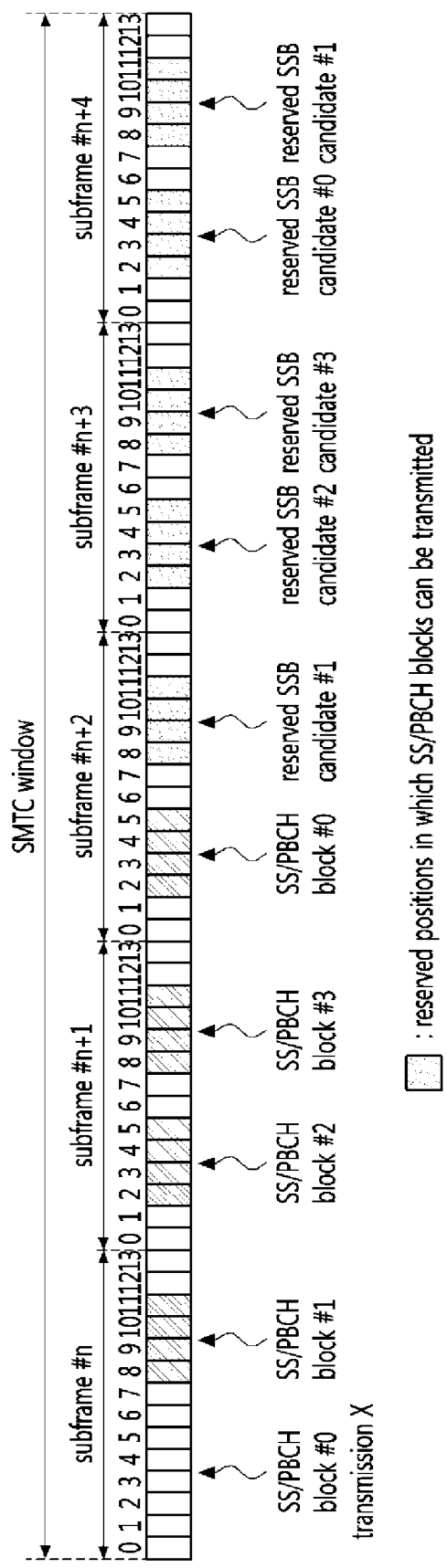
FIG. 13 is a conceptual diagram illustrating a first exemplary embodiment of a method of transmitting an SS/PBCH block in a wireless communication network.

FIG. 13 is a conceptual diagram illustrating a first exemplary embodiment of a method of transmitting an SS/PBCH block in a wireless communication network.

Referring to FIG. 13, when an SS/PBCH block is not transmitted in an SSB candidate (e.g., existing SSB candidate) within an SMTC window, the corresponding SS/PBCH block may be transmitted through a reserved SSB candidate located first in time among reserved SSB candidates having the same index as the corresponding SSB candidate (e.g., the SSB candidate in which the corresponding SS/PBCH block is not transmitted).

The configuration of the (reserved) SSB candidates in FIG. 13 may be the same as the configuration of the (reserved) SSB candidates in FIG. 12. The base station may not transmit the SS/PBCH block #0 in the SSB candidate #0 of the subframe #n. In this case, the base station may transmit the SS/PBCH block #0 in the reserved SSB candidate #0 of the subframe #(n+2) among the reserved SSB candidate #0 of the subframe #(n+2) and the reserved SSB candidate #0 of the subframe #(n+4). The SS/PBCH block #0 transmitted in the reserved SSB candidate #0 of the subframe #(n+2) may be the same as the SS/PBCH block #0 attempted to transmit in the SSB candidate #0 of the subframe #n.

Figure 14:
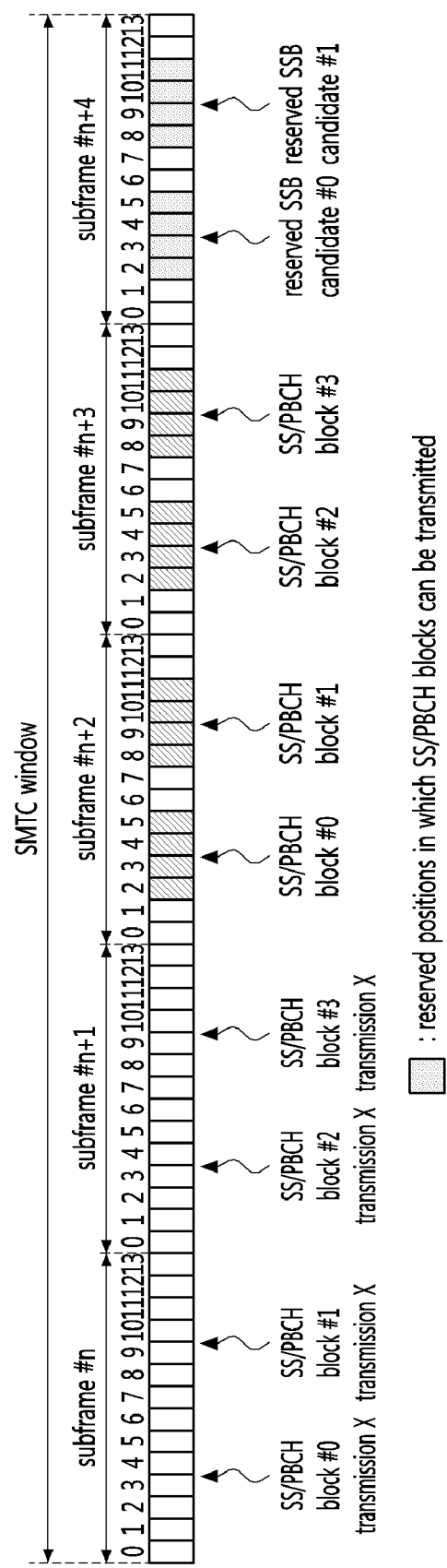
FIG. 14 is a conceptual diagram illustrating a second exemplary embodiment of a method of transmitting an SS/PBCH block in a wireless communication network.

FIG. 14 is a conceptual diagram illustrating a second exemplary embodiment of a method of transmitting an SS/PBCH block in a wireless communication network.

Referring to FIG. 14, when an SS/PBCH block is not transmitted in an SSB candidate (e.g., existing SSB candidate) within an SMTC window, the corresponding SS/PBCH block may be transmitted through a reserved SSB candidate located first in time among reserved SSB candidates having the same index as the corresponding SSB candidate (e.g., the SSB candidate in which the corresponding SS/PBCH block is not transmitted).

The configuration of the (reserved) SSB candidates in FIG. 14 may be the same as the configuration of the (reserved) SSB candidates in FIG. 12. The base station may not transmit the SS/PBCH blocks #0 to #3 in the SSB candidates #0 to #3 of the subframes #n to #(n+1). In this case, the base station may transmit the SS/PBCH block #0 (e.g., the SS/PBCH block #0 attempted to transmit in the SSB candidate #0 of the subframe #n) in the reserved SSB candidate #0 of the subframe #(n+2) among the reserved SSB candidate #0 of the subframe #(n+2) and the reserved SSB candidate #0 of the subframe #(n+4). The base station may transmit the SS/PBCH block #1 (e.g., the SS/PBCH block #1 attempted to transmit in the SSB candidate #1 of the subframe #n) in the reserved SSB candidate #1 of the subframe #(n+2) among the reserved SSB candidate #1 of the subframe #(n+2) and the reserved SSB candidate #1 of the subframe #(n+4).

The base station may transmit the SS/PBCH block #2 (e.g., the SS/PBCH block #2 attempted to transmit in the SSB candidate #2 of the subframe #(n+1)) in the reserved SSB candidate #2 of the subframe #(n+3). The base station may transmit the SS/PBCH block #3 (e.g., the SS/PBCH block #3 attempted to transmit in the SSB candidate #3 of the subframe #(n+1)) in the reserved SSB candidate #3 of the subframe #(n+3).

On the other hand, the terminal may obtain cell information (e.g., timing information) by receiving the SS/PBCH block. When the SS/PBCH block is transmitted in the reserved SSB candidate, the terminal may obtain wrong timing information. In the exemplary embodiment illustrated in FIG. 14, when the SS/PBCH blocks are received in the SSB candidates of the subframes #(n+2) and #(n+3), the terminal may determine the subframe #(n+2) as the subframe #n, and the subframe #(n+3) as the subframe #(n+1) based on the indexes of the corresponding SS/PBCH blocks.

In order to solve this problem, the base station may need to inform the terminal that the SS/PBCH block is transmitted through the (reserved) SSB candidate other than the existing SSB candidate. For example, the base station may inform the terminal of an offset (e.g., delay value) between the position of the SSB candidate attempted to transmit the SS/PBCH block and the position of the SSB candidate in which the SS/PBCH block is actually transmitted. The offset (e.g., delay value) may be set to the number of the positions in which the SS/PBCH block can be transmitted (e.g., the number of (reserved) SSB candidates).

In the exemplary embodiment illustrated in FIG. 14, since the SS/PBCH block #0 is delayed by four (reserved) SSB candidates from the SSB candidate #0 of the subframe #n, the base station may inform an offset (e.g., delay value) of 4. The offset (e.g., delay value) may be included in a PBCH payload. The terminal may obtain a PBCH payload by demodulating and decoding a PBCH included in the SS/PBCH block, obtain the offset (e.g., delay value) from the PBCH payload, and obtain cell timing information based on the offset (e.g., delay value).

Hereinafter, methods of transmitting and receiving signals/channels (e.g., SS/PBCH blocks) within an SMTC window will be described. The base station may transmit a signal (hereinafter, referred to as a 'discovery reference signal (DRS)') including an SS/PBCH block for synchronization acquisition/maintenance and channel quality measurement. The DRS may include not only the SS/PBCH block but also remaining minimum system information (RSI), other system information (OSI), a reference signal, and the like.

The base station may configure an SMTC window for the DRS, and may transmit configuration information of the SMTC window to the terminal. The base station may transmit the DRS within the SMTC window, and the terminal may receive the DRS by performing a monitoring operation in the SMTC window. The base station may transmit the DRS at a predetermined position within the SMTC window.

Figure 15:
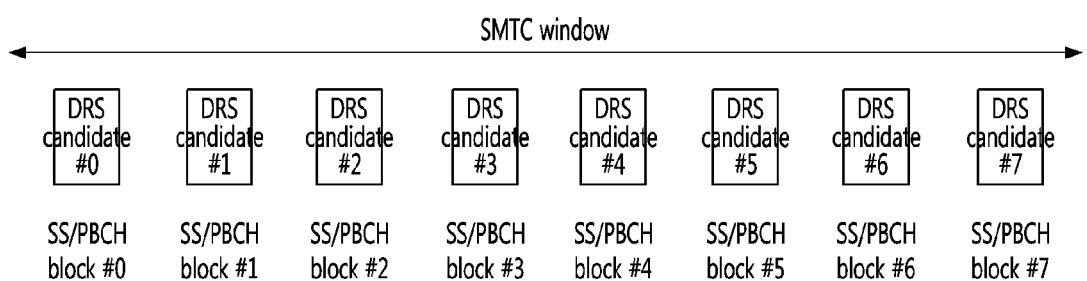
FIG. 15 is a conceptual diagram illustrating a first exemplary embodiment of a method of transmitting a DRS in a wireless communication network.

FIG. 15 is a conceptual diagram illustrating a first exemplary embodiment of a method of transmitting a DRS in a wireless communication network.

Referring to FIG. 15, M positions in which DRSs can be transmitted (hereinafter, referred to as 'DRS candidates') may be configured within an SMTC window. Indexes of subframes, slots, and/or symbols in which the DRS candidates are configured in the time axis may be predefined. The base station may transmit SS/PBCH blocks having different indexes in the DRS candidates. The index of the SS/PBCH block may be indicated by a PBCH DMRS sequence and/or a PBCH payload. Upon receiving the DRS including the SS/PBCH block, the terminal may estimate the index of the corresponding SS/PBCH block using the PBCH DMRS sequence and/or the PBCH payload. The terminal may obtain cell timing information using the estimated index. That is, the terminal may estimate timing information using the PBCH DMRS sequence and/or the PBCH payload.

The number of DRS candidates within the SMTC window may be 8. The base station may transmit SS/PBCH blocks having different indexes in the 8 DRS candidates. For example, an index of an SS/PBCH block included in a DRS transmitted through a DRS candidate #0 may be 0. The terminal may receive the DRS including the SS/PBCH block within the SMTC window. The terminal may obtain cell timing information based on the SS/PBCH block (e.g., the index of the SS/PBCH block) included in the DRS. An SS/PBCH block having a preconfigured index may be transmitted through one or more DRS candidates among the 8 DRS candidates. Upon receiving the DRS, the terminal may obtain cell timing information by detecting the index of the SS/PBCH block included in the DRS.

Figure 16:
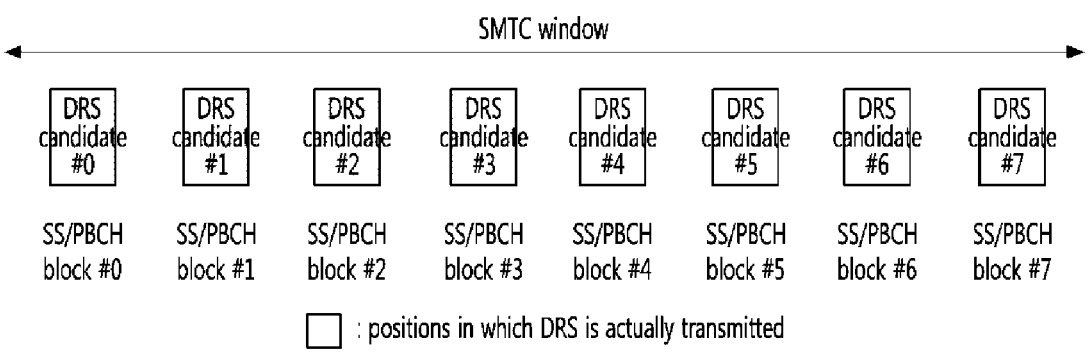
FIG. 16 is a conceptual diagram illustrating a second exemplary embodiment of a method of transmitting a DRS in a wireless communication network.

FIG. 16 is a conceptual diagram illustrating a second exemplary embodiment of a method of transmitting a DRS in a wireless communication network.

Referring to FIG. 16, the base station may transmit DRSs in N DRS candidates among M DRS candidates within the SMTC window. M may be a natural number and N may be a natural number less than M. For example, M may be 8 and N may be 4. In this case, the base station may transmit the DRSs in the DRS candidates #0 to #3. The DRS transmitted in the DRS candidate #0 may include an SS/PBCH block having an index #0, and the DRS transmitted in the DRS candidate #1 may include an SS/PBCH block having an index #1. The DRS transmitted in the DRS candidate #2 may include an SS/PBCH block having an index #2, and the DRS transmitted in the DRS candidate #3 may include an SS/PBCH block having an index #3. The terminal may receive the DRSs in the DRS candidates #0 to #3, and may obtain cell timing information based on the SS/PBCH block included in the DRS.

The base station may transmit N DRSs using one or more beams within the SMTC window. For example, the base station may transmit N DRSs using the same beam within the SMTC window. When N DRSs are transmitted using the same beam, the terminal may assume that the N DRSs have a QCL relationship. Accordingly, the terminal may perform a soft combining operation on the N DRSs. Here, the N DRSs transmitted using the same beam may include the same information. Alternatively, the base station may transmit the N DRSs using different beams within the SMTC window. When the N DRSs are transmitted using different beams, the terminal may assume that the N DRSs do not have a QCL relationship. Therefore, the terminal may not perform a soft combining operation on the N DRSs.

When the DRSs are actually transmitted in the N DRS candidates among the M DRS candidates, the base station may inform the terminal of N. N may be indicated by an SS/PBCH block (e.g., PBCH payload) and/or RMSI included in the DRS. Alternatively, N may be transmitted through an RRC message and/or a physical downlink control channel (PDCCH) (e.g., downlink control information (DCI)). The terminal may estimate the number of DRSs actually transmitted based on N.

The base station may inform the terminal of the number X of beams used for DRS transmission (e.g., SS/PBCH transmission) within the SMTC window. When N DRSs are transmitted, the base station may inform the terminal of the number X of beams used for transmission of the N DRSs.

Information indicating the number X of beams may be transmitted to the terminal through an SS/PBCH block (e.g., PBCH payload) and/or RMSI included in the DRS. The information indicating the number X of beams may be transmitted to the terminal through an RRC message and/or a PDCCH (e.g., DCI). The terminal may estimate the number X of beams used for DRS transmission based on the information received from the base station.

The base station may inform the terminal of the number of DRSs actually transmitted and/or the number of beams used for DRS transmission within the SMTC window. The number of DRSs actually transmitted may be the same as the number of beams used for DRS transmission. In the exemplary embodiment illustrated in FIG. 16, since 4 DRSs are transmitted using 4 different beams, the base station may inform the terminal of 4. The terminal may estimate the number of DRSs actually transmitted and the number of beams used for DRS transmission within the SMTC window based on the information received from the base station.

When the number N of DRSs actually transmitted is greater than the number X of beams used for DRS transmission, the base station may transmit a plurality of DRSs using the same beam within the SMTC window. The base station may inform the terminal of the number N of DRSs actually transmitted and the number X of beams used for DRS transmission.

The base station may transmit DRSs through the N DRS candidates among the M DRS candidates. The N DRSs may be transmitted using X beams. X may be a natural number of M or less. For example, the base station may continuously transmit DRSs using the same beam. When X is 2, the base station may transmit the DRSs using two beams. In the exemplary embodiment illustrated in FIG. 16, the base station may transmit a DRS including the SS/PBCH block #0 using the beam #0 in the DRS candidate #0, and a DRS including the SS/PBCH block #1 using the beam #0 in the DRS candidate #1. The base station may transmit a DRS including the SS/PBCH block #2 using the beam #1 in the DRS candidate #2, and a DRS including the SS/PBCH block #3 using the beam #1 in the DRS candidate #3. When the base station transmits N DRSs using X beams, the beam index may be defined based on Equation 4 below.

Beam index=floor(SS/PBCH block index(modulo)$N,X$) [Equation 4]

When N DRSs are transmitted using X beams, the base station may control the DRS transmission so that the DRSs are transmitted using beams having sequentially increasing indexes. In the exemplary embodiment illustrated in FIG. 16, the base station may transmit a DRS including the SS/PBCH block #0 using the beam #0 in the DRS candidate #0, and a DRS including the SS/PBCH block #1 using the beam #1 in the DRS candidate #1. The base station may transmit a DRS including the SS/PBCH block #2 using the beam #0 in the DRS candidate #2, and a DRS including the SS/PBCH block #3 using the beam #1 in the DRS candidate #3.

When the base station transmits N DRSs using X beams, the beam index may be defined based on Equation 5 below.

Beam index=SS/PBCH block index(modulo)($N/X$) [Equation 5]

The base station may inform the terminal of the number of DRSs actually transmitted (e.g., 4) and the number of beams used for DRS transmission (e.g., 2). The terminal may estimate the index of the beam used for DRS transmission based on the information received from the base station, and may receive the DRS through the beam corresponding to the estimated index. The terminal may perform a soft combining operation on the DRSs having the same beam index.

The base station may transmit a DRS including an SS/PBCH block based on Equation 6 below. In Equation 6, the SS/PBCH block index may be an index of an SSB candidate in which the corresponding SS/PBCH block is transmitted. According to Equation 6, DRSs including SS/PBCH blocks having the same beam index may be transmitted using the same beam. The terminal may assume that DRSs including SS/PBCH blocks having the same beam index have a QCL relationship according to Equation 6. The terminal may perform a soft combining operation on the DRSs having a QCL relationship. In Equation 6, X may be the number of beams used for DRS transmission. The base station may inform X to the terminal. The terminal may estimate the beam through which the DRS is transmitted based on the beam index calculated by Equation 6. The terminal may perform a soft combining operation on the DRSs (e.g., SS/PBCH blocks) having the same beam index based on the result of Equation 6.

Beam index=SS/PBCH block index(modulo)$X$ [Equation 6]

When N DRSs are transmitted within the SMTC window and the number X of beams used for DRS transmission is equal to N, the base station may transmit DRSs including SS/PBCHs having the same beam index using the same beam according to Equation 7. In Equation 7, the SS/PBCH block index may be an index of an SSB candidate in which the corresponding SS/PBCH block is transmitted. The terminal may assume that DRSs including SS/PBCH blocks having the same beam index have a QCL relationship according to Equation 7. The terminal may perform a soft combining operation on the DRSs having a QCL relationship. In Equation 7, N may be the number of DRSs actually transmitted within the SMTC window. The base station may inform N to the terminal. The terminal may estimate the beam through which the DRS is transmitted based on the beam index calculated by Equation 7. The terminal may perform a soft combining operation on the DRSs (e.g., SS/PBCH blocks) having the same beam index based on the result of Equation 7.

Beam index=SS/PBCH block index(modulo)$N$ [Equation 7]

Hereinafter, a method of transmitting and receiving timing information, information on QCL between DRSs, and information on the number of beams used for DRS transmission within an SMTC window will be described. There may be M DRS candidates within the SMTC window, and the positions of the M DRS candidates may be preconfigured. The spacing between the M DRS candidates in the time axis may be uniform.

Figure 17:
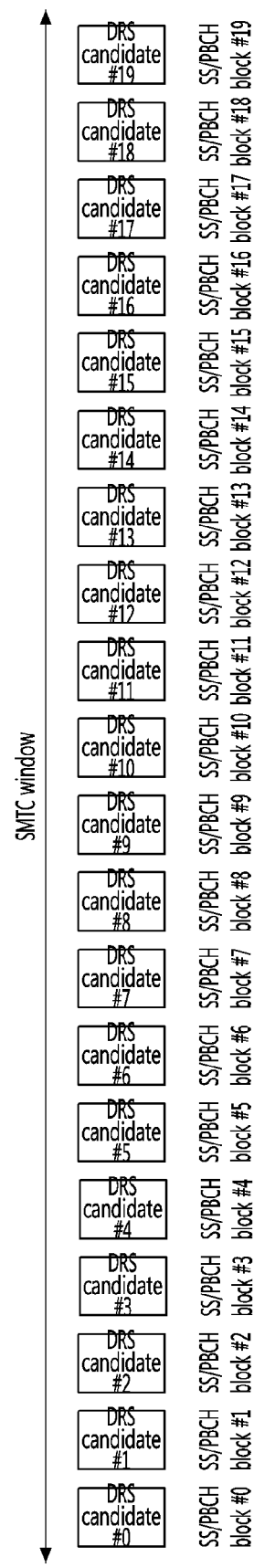
FIG. 17 is a conceptual diagram illustrating a third exemplary embodiment of a method of transmitting a DRS in a wireless communication network.

FIG. 17 is a conceptual diagram illustrating a third exemplary embodiment of a method of transmitting a DRS in a wireless communication network.

Referring to FIG. 17, 20 DRS candidates may exist within the SMTC window. The index of each of the DRS candidates may be configured. Alternatively, the index of the SS/PBCH block may be used as the index of the DRS candidate (e.g., the index of the DRS including the corresponding SS/PBCH block) in which the corresponding SS/PBCH block is transmitted. The indexes of the SS/PBCH blocks (e.g., the indexes of the DRS candidates or the indexes of the DRSs) may be assigned in ascending order overtime. The DRS candidate #0 to the DRS candidate #19 may be configured in the SMTC window. The base station may indicate the index of the SS/PBCH block (e.g., the index of the DRS candidate or the index of the DRS) using a PBCH DMRS sequence and/or a PBCH payload. For example, the index of the SS/PBCH block may be defined based on Equation 8 below.

$$\text{SS/PBCH block index} = a \times b + c \qquad \text{[Equation 8]}$$

c may be indicated by the PBCH DMRS. a may be the maximum value that can be indicated by the PBCH DMRS. In addition, a may be a constant. For example, when a value that can be indicated by the PBCH DMRS is 0 to 7, a may be 8. b may be indicated by the PBCH payload.

Alternatively, c may be indicated by the PBCH payload. a may be the maximum value that can be indicated by the PBCH payload. In addition, a may be a constant. For example, when a value that can be indicated by the PBCH payload is 0 to 3, a may be 4. b may be indicated by the PBCH DMRS.

The base station may indicate the index of the SS/PBCH block using the PBCH DMRS and/or the PBCH payload. The terminal may estimate the index of the SS/PBCH block using the PBCH DMRS and/or the PBCH payload. The base station may obtain cell timing information of the base station using the estimated index of the SS/PBCH block.

The base station may perform DRS transmission in N DRS candidates among M DRS candidates within the SMTC window. N may be a natural number equal to or less than M. The base station may perform DRS transmission using different beams in the N DRS candidates. For example, the base station may perform DRS transmission using X beams in N DRS candidates. X may be a natural number equal to or less than N.

The base station may inform the terminal of the number N of DRS candidates in which the DRSs are actually transmitted among the M DRS candidates within the SMTC window. The base station may indicate the number N of DRSs actually transmitted within the SMTC window using the PBCH payload. Alternatively, the base station may inform the terminal of N using an SS/PBCH block and/or RMSI. Alternatively, the base station may inform the terminal of N using an RRC message and/or a PDCCH (e.g., DCI). The terminal may estimate the number N of DRSs actually transmitted based on the information received from the base station.

The terminal may perform rate matching of a downlink channel using N. N may be equal to the number of PBCH DMRS sequences. When the number of PBCH DMRS sequences is K, the base station may transmit K DRSs within one SMTC window. Alternatively, the number of DRSs transmitted within one SMTC window may be the same as the number of beams used for DRS transmission. The base station may indicate the number of DRSs actually transmitted within the SMTC window and/or the number of beams used for DRS transmission by using the PBCH payload. The base station may indicate the number of DRSs actually transmitted within the SMTC window using the SS/PBCH block and/or RMSI, and may indicate the number of beams used for DRS transmission within the SMTC window using the SS/PBCH block and/or RMSI. The number of DRSs actually transmitted within the SMTC window may be the same as the number of beams used for DRS transmission. The terminal may estimate the number of DRSs actually transmitted within the SMTC window and/or the number of beams used for DRS transmission based on the information received from the base station.

Figure 18:
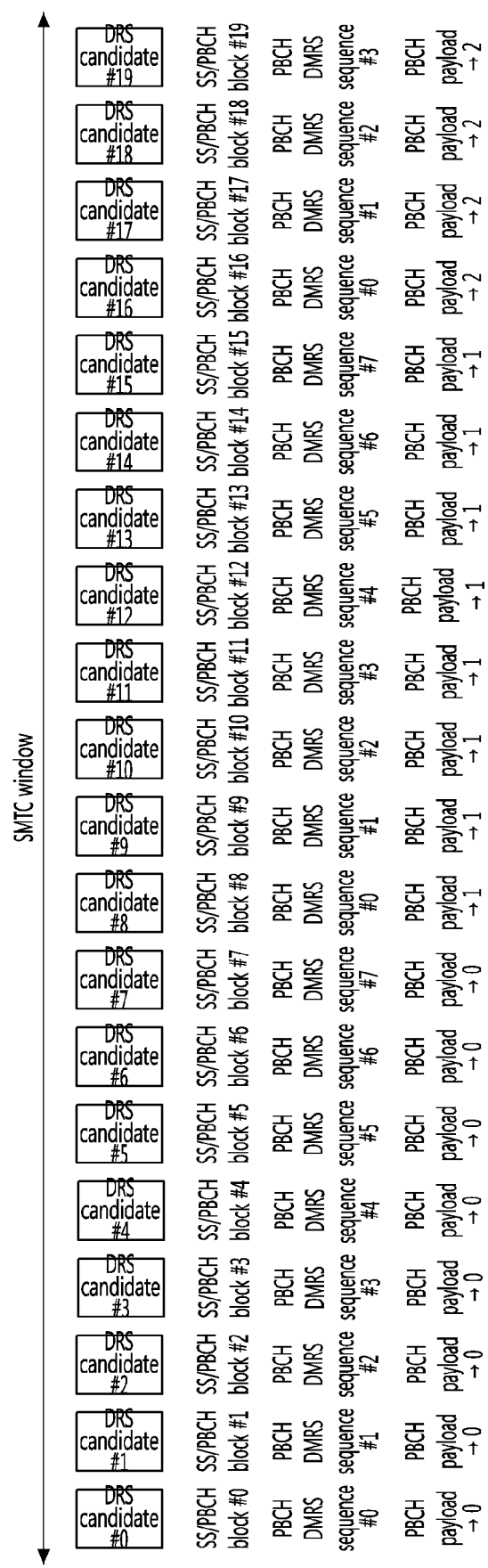
FIG. 18 is a conceptual diagram illustrating a fourth exemplary embodiment of a method of transmitting a DRS in a wireless communication network.

FIG. 18 is a conceptual diagram illustrating a fourth exemplary embodiment of a method of transmitting a DRS in a wireless communication network.

Referring to FIG. 18, when X beams are used for DRS transmission, the base station may transmit SS/PBCH blocks (e.g., DRSs including the SS/PBCH blocks) having the same PBCH DMRS sequence (e.g., the same initialization value of the PBCH DMRS sequence) among M SS/PBCH blocks by using the same beam. The base station may indicate the index of the SS/PBCH block using a PBCH DMRS sequence and/or a PBCH payload. In Equation 8, a may be 8, which is the maximum value that can be indicated by the PBCH DMRS. In Equation 8, b may be indicated by the PBCH payload. c in Equation 8 may be indicated by the PBCH DMRS.

The PBCH DMRS sequences (e.g., initialization values (iSSBs) of the PBCH DMRS sequences) of the SS/PBCH blocks #0, #8, and #16 may be the same. The base station may transmit DRSs including the SS/PBCH blocks having the same PBCH DMRS sequence using the same beam. The terminal may assume that the DRSs including the SS/PBCH blocks having the same PBCH DMRS sequence are transmitted using the same beam. Also, the terminal may assume that the DRSs including the SS/PBCH blocks having the same PBCH DMRS sequence have a QCL relationship. Accordingly, the terminal may perform a soft combining operation on the SS/PBCH blocks (e.g., the DRSs including the SS/PBCH blocks) having the same PBCH DMRS sequence.

The base station may inform the terminal of the number X of beams used for DRS transmission within the SMTC window. The number X of beams used for DRS transmission within the SMTC window may be indicated through an SS/PBCH block (e.g., PBCH payload) and/or RMSI. Alternatively, the number X of beams used for DRS transmission within the SMTC window may be indicated by an RRC message and/or a PDCCH (e.g., DCI).

When the DRS transmission is performed using X beams in the N DRS candidates among the M DRS candidates within the SMTC window, the indexes of the beams used for transmission of the N DRSs in the N DRS candidates may increase sequentially in the time axis. When SS/PBCH blocks #0 to #7 (e.g., DRSs including the SS/PBCH blocks #0 to #7) are transmitted using 8 beams, the base station transmit a DRS including the SS/PBCH block #0 using a beam #0, a DRS including the SS/PBCH block #1 using a beam #1, a DRS including the SS/PBCH block #2 using a beam #2, and a DRS including the SS/PBCH block #3 using a beam #3. Also, the base station transmit a DRS including the SS/PBCH block #4 using a beam #4, a DRS including the SS/PBCH block #5 using a beam #5, a DRS including the SS/PBCH block #6 using a beam #6, and a DRS including the SS/PBCH block #7 using a beam #7.

When SS/PBCH blocks #0 to #7 (e.g., DRSs including the SS/PBCH blocks #0 to #7) are transmitted using 4 beams, the base station transmit a DRS including the SS/PBCH block #0 using a beam #0, a DRS including the SS/PBCH block #1 using a beam #1, a DRS including the SS/PBCH block #2 using a beam #2, and a DRS including the SS/PBCH block #3 using a beam #3. Also, the base station transmit a DRS including the SS/PBCH block #4 using a beam #0, a DRS including the SS/PBCH block #5 using a beam #1, a DRS including the SS/PBCH block #6 using a beam #2, and a DRS including the SS/PBCH block #7 using a beam #3.

The terminal may receive the information indicating the number X of beams used for DRS transmission within the SMTC from the base station. For example, the terminal may identify the number X of beams indicated by the SS/PBCH block (e.g., PBCH payload) and/or RMSI. Alternatively, the terminal may identify the number X of beams indicated by the RRC message and/or PDCCH (e.g., DCI).

The terminal may identify the DRSs transmitted using the same beam based on the number X of beams used for DRS transmission within the SMTC. The terminal may estimate a QCL between the DRSs (e.g., QCL between the SS/PBCH blocks) using X. For example, the terminal may calculate a QCL index based on Equation 9 below, and may assume that SS/PBCH blocks (e.g., DRSs) associated with PBCH DMRS sequences (e.g., initialization values of the PBCH DMRSs) having the same QCL index have a QCL relationship. In Equation 9, the QCL index may mean a beam index.

$$\text{QCL index}=\text{PBCH DMRS sequence index(modulo)}X \quad \text{[Equation 9]}$$

The base station may transmit information indicating the number N of the DRSs actually transmitted within the SMTC to the terminal. The number N of DRSs actually transmitted within the SMTC may be less than or equal to the number X of beams used for DRS transmission within the SMTC. The terminal may estimate SS/PBCH blocks (e.g., DRSs) transmitted using the same beam based on N. The terminal may estimate a QCL between the DRSs (e.g., QCL between SS/PBCH blocks) using N. For example, the terminal may calculate a QCL index based on Equation 10 below, and may assume that SS/PBCH blocks (e.g., DRSs) associated with PBCH DMRS sequences (e.g., initialization values of the PBCH DMRSs) having the same QCL index have a QCL relationship. In Equation 10, the QCL index may mean a beam index.

$$\text{QCL index}=\text{PBCH DMRS sequence index(modulo)}N \quad \text{[Equation 10]}$$

The terminal may identify the DRSs (e.g., SS/PBCH blocks) transmitted using the same beam based on the QCL index, and may perform a soft combining operation on the DRSs (e.g., SS/PBCH blocks) transmitted using the same beam.

The base station may perform a joint encoding for one or more of the number N of DRSs actually transmitted within the SMTC window, the number X of beams used for DRS transmission within the SMTC, and the index of the SS/PBCH block, and transmit a result of the joint encoding to the terminal. The result of the joint encoding may be included in the PBCH payload. The terminal may obtain the result of the joint encoding from the base station, and identify one or more of the number N of DRSs actually transmitted within the SMTC window, the number X of beams used for DRS transmission within the SMTC, and the index of the SS/PBCH block.

Figure 19:
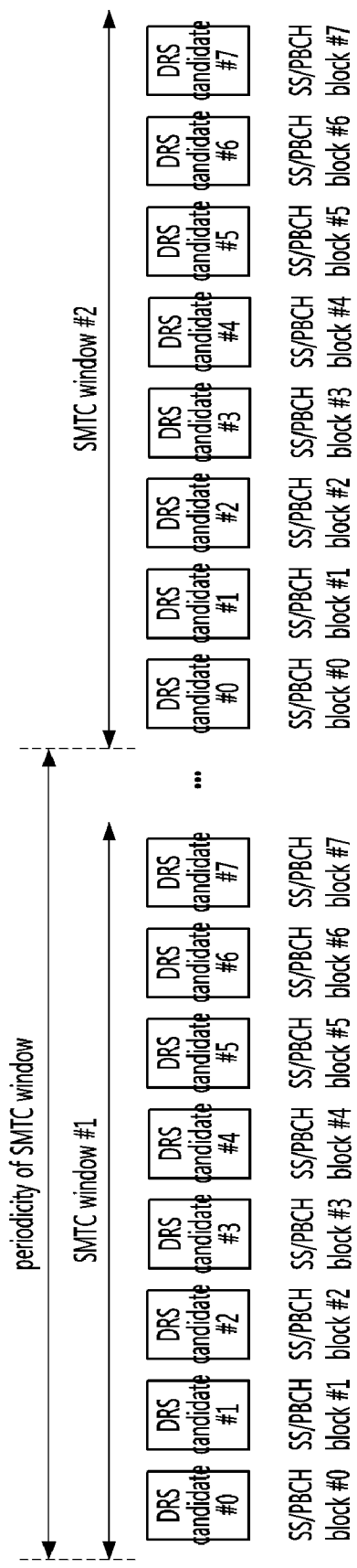
FIG. 19 is a conceptual diagram illustrating a fifth exemplary embodiment of a method of transmitting a DRS in a wireless communication network.

FIG. 19 is a conceptual diagram illustrating a fifth exemplary embodiment of a method of transmitting a DRS in a wireless communication network.

Referring to FIG. 19, the number of DRS candidates within each of SMTC windows may be the same. Also, the positions of DRS candidates (e.g., subframes, slots, and/or symbols in which the DRS candidates are configured) within each of the SMTC windows may be the same. For example, an index of subframe, slot, and/or symbol occupied by an SS/PBCH block #0 transmitted in a DRS candidate #0 within a SMTC window #1 may be the same as an index of subframe, slot, and/or symbol occupied by an SS/PBCH block #0 in a DRS candidate #0 within a SMTC window #2.

The base station may transmit DRSs including SS/PBCH blocks having the same index in different SMTC windows using the same beam. A transmission beam of the DRS including the SS/PBCH block #0 within the SMTC window #1 may be the same as a transmission beam of the DRS including the SS/PBCH block #0 within the SMTC window #2. The terminal may assume that DRSs including SS/PBCH blocks having the same index in different SMTC windows have a QCL relationship. For example, the terminal may receive a DRS including the SS/PBCH block #0 in the DRS candidate #0 within the SMTC window #1, and a DRS including the SS/PBCH block #0 in the DRS candidate #0 within the SMTC window #2. In this case, the terminal may assume that the DRS (e.g., SS/PBCH block #0) received in the DRS candidate #0 within the SMTC window #1 and the DRS (e.g., SS/PBCH block #0) received in the DRS candidate #0 within the SMTC window #2 have a QCL relationship. Accordingly, the terminal may perform a soft combining operation on the DRSs (e.g., the SS/PBCH blocks) having a QCL relationship.

The base station may transmit DRSs including SS/PBCH blocks having the same PBCH DMRS sequence (e.g., the same initialization value of the PBCH DMRS sequence) in different SMTC windows using the same beam. The terminal may assume that the DRSs including the SS/PBCH blocks having the same PBCH DMRS sequence are transmitted in different SMTC windows using the same beam. Accordingly, the terminal may assume that the DRSs including the SS/PBCH blocks having the same PBCH DMRS sequence in different SMTC windows have a QCL relationship.

The base station may transmit N DRSs within each of the SMTC windows. The positions of the N DRSs within each of the SMTC windows may be different. For example, the base station may transmit DRSs in the DRS candidates #0 to #3 within the SMTC window #1 and DRSs in the DRS candidates #4 to #7 within the SMTC window #2. The base station may inform the number X of beams used for DRS transmission within each of the SMTC windows to the terminal in the SMTC window #1 and/or the SMTC window #2. The base station may transmit 4 DRSs using 4 beams within the SMTC window #1, and may transmit 4 DRSs using 4 beams within the SMTC window #2. In this case, the base station may inform the terminal that 4 beams are used for DRS transmission.

The base station may determine a beam (e.g., index of the beam) used for DRS transmission (e.g., SS/PBCH block transmission) based on Equation 6 or 7. When the number X of beams used for DRS transmission is 4, an SS/PBCH block #0 (e.g., DRS including the SS/PBCH block #0) may be transmitted using a beam #0, an SS/PBCH block #1 (e.g., DRS including the SS/PBCH block #1) may be transmitted using a beam #1, an SS/PBCH block #2 (e.g., DRS including the SS/PBCH block #2) may be transmitted using a beam #2, and an SS/PBCH block #3 (e.g., DRS including the SS/PBCH block #3) may be transmitted using a beam #3. Also, an SS/PBCH block #4 (e.g., DRS including the SS/PBCH block #4) may be transmitted using a beam #0, an SS/PBCH block #5 (e.g., DRS including the SS/PBCH block #5) may be transmitted using a beam #1, an SS/PBCH block #6 (e.g., DRS including the SS/PBCH block #6) may be transmitted using a beam #2, and an SS/PBCH block #7 (e.g., DRS including the SS/PBCH block #7) may be transmitted using a beam #3.

The terminal may estimate a beam (e.g., beam index) used for DRS transmission (e.g., SS/PBCH block transmission) based on Equation 6 or 7. The terminal may estimate a beam (e.g., beam index) used for DRS transmission (e.g., SS/PBCH block transmission) based on the SS/PBCH block index and the number X of beams used for DRS transmission. The terminal may identify DRSs (e.g., SS/PBCH blocks) having a QCL relationship in different SMTC windows on the basis of the beam index, and may perform a soft combining operation on the identified DRSs (e.g., SS/PBCH blocks).

The base station may determine a beam (e.g., index of the beam) used for DRS transmission (e.g., SS/PBCH block transmission) based on Equation 9 or 10. When the number of PBCH DMRS sequence is 8 and the number X of beams used for DRS transmission is 4, an SS/PBCH block #0 having a PBCH DMRS sequence #0 (e.g., DRS including the SS/PBCH block #0) may be transmitted using a beam #0, an SS/PBCH block #1 having a PBCH DMRS sequence #1 (e.g., DRS including the SS/PBCH block #1) may be transmitted using a beam #1, an SS/PBCH block #2 having a PBCH DMRS sequence #2 (e.g., DRS including the SS/PBCH block #2) may be transmitted using a beam #2, and an SS/PBCH block #3 having a PBCH DMRS sequence #3 (e.g., DRS including the SS/PBCH block #3) may be transmitted using a beam #3.

Also, an SS/PBCH block #4 having a PBCH DMRS sequence #4 (e.g., DRS including the SS/PBCH block #4) may be transmitted using a beam #0, an SS/PBCH block #5 having a PBCH DMRS sequence #5 (e.g., DRS including the SS/PBCH block #5) may be transmitted using a beam #1, an SS/PBCH block #6 having a PBCH DMRS sequence #6 (e.g., DRS including the SS/PBCH block #6) may be transmitted using a beam #2, and an SS/PBCH block #7 having a PBCH DMRS sequence #7 (e.g., DRS including the SS/PBCH block #7) may be transmitted using a beam #3.

The terminal may estimate a QCL index (e.g., beam index) based on Equation 9 or 10. The terminal may identify DRSs (e.g., SS/PBCH blocks) having a QCL relationship in different SMTC windows on the basis of the QCL index (e.g., beam index), and may perform a soft combining operation on the identified DRSs (e.g., SS/PBCH blocks).

When the number of DRSs to be transmitted within the SMTC window is 4, the base station may attempt to transmit DRSs in the DRS candidates located at a position ahead in the time axis among the M DRS candidates. In the exemplary embodiment illustrated in FIG. 19, the base station may attempt DRS transmission in the DRS candidates #0 to #3 within the SMTC window #1. When DRS transmission is possible in the DRS candidates #0 to #3, the base station may transmit the DRS in the DRS candidates #0 to #3 within the SMTC window #1. The terminal may perform DRS detection from a DRS candidate (e.g., DRS candidate #0) that is advanced in the time axis among the DRS candidates within the SMTC window #1. The terminal may assume that the base station transmits DRSs in consecutive DRS candidates. For example, when the DRS is detected in the DRS candidate #0, the terminal may assume that the base station transmits the DRSs in the DRS candidates #0 to #3.

Hereinafter, a method of indicating an SS/PBCH block index and a method of indicating the number of beams used for DRS transmission will be described. The base station may indicate the SS/PBCH block index using a PBCH payload and/or a PBCH DMRS sequence. Also, the base station may indicate the number of beams used for DRS transmission using a PBCH payload and/or a PBCH DMRS sequence. The terminal may identify at least one of the number of beams used for DRS transmission and the SS/PBCH block index by performing a PBCH DMRS sequence detection operation and/or a PBCH demodulation and decoding operation. When the size of the SS/PBCH block index is 6 bits, 3 bits of the 6 bits may be indicated by an initialization value (iSSB) of the PBCH DMRS sequence, and the remaining 3 bits of the 6 bits may be indicated by the PBCH payload. When the size of the information indicating the number of beams used for DRS transmission is 6 bits, 3 bits of the 6 bits may be indicated by an initialization value (iSSB) of the PBCH DMRS sequence, and the remaining 3 bits of the 6 bits may be indicated by the PBCH payload. In this case, the terminal may identify at least one of the number of beams used for DRS transmission and the SS/PBCH block index based on a combination of the PBCH DMRS sequence and the PBCH payload.

The base station may indicate a part of the SS/PBCH block index using the PBCH DMRS sequence, and may indicate the remaining part of the SS/PBCH block index using the PBCH payload. Also, the base station may indicate the number of beams used for DRS transmission using the PBCH payload. The terminal may estimate the SS/PBCH block index using the PBCH DMRS sequence and the PBCH payload. Also, the terminal may estimate the number of beams used for DRS transmission using the PBCH payload.

Alternatively, the base station may indicate the number of beams used for DRS transmission using some of the initialization values of the PBCH DMRS sequence. The terminal may estimate the number of beams used for DRS transmission based on the initialization value of the PBCH DMRS sequence.

Hereinafter, a method of indicating the number of DRSs actually transmitted within the SMTC window will be described. The number of DRS candidates within the SMTC window may be M. The DRSs may be actually transmitted through N DRS candidates among the M DRS candidates, and the DRS may not be transmitted in the remaining (M-N) DRS candidates. The base station may inform the terminal of the number N of DRSs actually transmitted. Also, the base station may inform the terminal of one or more among an index of an SS/PBCH block included in the actually-transmitted DRS, an index of a DRS candidate in which the DRS is transmitted, an index of an SSB candidate in which the SS/PBCH block is transmitted, and an index of a PBCH DMRS sequence associated with the SS/PBCH block. The terminal may perform a rate matching operation on the corresponding resources based on the number N of DRSs actually transmitted and/or the index of the SS/PBCH block indicated by the base station. For example, the terminal may perform a rate matching operation on the DRS indicated by the base station or transmission resources of the SS/PBCH block included in the DRS.

The base station may transmit one or more DRSs using different frequency resources in the same time interval. The base station may set configuration of data, reference signal, and the like identically in the DRSs transmitted using different frequency resources. For example, the base station may transmit a DRS_f1 at a frequency f1 and may transmit a DRS_f2 at a frequency f2. In this case, the configuration of the DRS_f1 may be the same as the configuration of the DRS_f2.

The base station may inform the terminal of information of the DRSs actually transmitted using different frequency resources in the same time interval. The base station may inform the terminal of information of the DRS actually transmitted (e.g., information indicating whether the DRS is actually transmitted) among the DRSs configured to be transmitted using different frequency resources in the same time interval.

When the information of the actually-transmitted DRSs (e.g., information indicating that one or more DRSs are transmitted using different frequency resources in the same time interval) is obtained from the base station, the terminal may determine that the DRSs are transmitted in all positions (e.g., frequency resources) in which the DRS can be transmitted in the same time interval. In this case, the terminal may perform a rate matching operation on all the positions (e.g., frequency resources) in which the DRS can be transmitted in the same time interval.

The base station may transmit information indicating the DRS candidate(s) in which the DRS is actually transmitted among the DRS candidates within the SMTC window to the terminal. For example, the base station may inform the terminal of the beam index and/or QCL information of the DRS actually transmitted through the DRS candidates within the SMTC window. The terminal may obtain information (e.g., beam index of the DRS, QCL information) indicating the DRS candidate(s) in which the DRS is actually transmitted from the base station, and perform a rate matching operation based on the obtained information.

For example, the terminal may perform a rate matching operation on the DRS candidate having the same beam index as the beam index of the DRS indicated by the base station. Alternatively, the terminal may perform a rate matching operation on the DRS candidate having the same QCL information as the QCL information of the DRS (e.g., actually transmitted DRS) indicated by the base station. The beam index or QCL information of the DRS may be estimated based on Equations 9 to 10.

For example, when the base station performs a specific RRC configuration operation, the terminal may perform a rate matching operation on all DRS candidates within the SMTC window. In the exemplary embodiment illustrated in FIG. 16, the DRS transmission may be performed in the DRS candidates #0 to #3 within the SMTC window. However, when a specific RRC configuration operation is performed, the base station may transmit the DRSs in all DRS candidates (e.g., DRS candidates #0 to #7) within the SMTC window. Accordingly, the terminal may perform a rate matching operation on the DRS candidates #0 to #7 within the SMTC window.

The base station may inform the terminal whether to transmit the DRSs in the DRS candidates. For example, the base station may transmit a DCI (e.g., group common DCI) including information indicating whether to transmit the DRSs in the DRS candidates. The terminal may identify whether the DRSs are transmitted in the DRS candidates by receiving the DCI (e.g., group common DCI). When a DRS is transmitted from a specific DRS candidate, the terminal may perform a rate matching operation on the specific DRS candidate.

Alternatively, the base station may transmit a PBCH (e.g., PBCH payload) including information indicating whether to transmit the DRSs in the DRS candidates. The terminal may identify whether the DRSs are transmitted in the DRS candidates by receiving the PBCH (e.g., PBCH payload). When a DRS is transmitted from a specific DRS candidate, the terminal may perform a rate matching operation on the specific DRS candidate.

Alternatively, the base station may transmit RMSI including information indicating whether to transmit the DRSs in the DRS candidates. The terminal may identify whether the DRSs are transmitted in the DRS candidates by receiving the RMSI. When a DRS is transmitted from a specific DRS candidate, the terminal may perform a rate matching operation on the specific DRS candidate.

On the other hand, the terminal may estimate the positions in which the DRSs are actually transmitted by combining at least one of configuration information of channel occupancy time (COT), the number of DRSs actually transmitted within the SMTC window, and the number of beams used for DRS transmission within the SMTC window, and perform a rate matching operation at the estimated positions. The base station may perform DRS transmission in the DRS candidates after the starting time point of the COT. In the exemplary embodiment shown in FIG. 15, when the starting time point of the COT is between the DRS candidate #1 and the DRS candidate #2, the base station may perform the DRS transmission from the DRS candidate #2.

The base station may inform the terminal of at least one of the configuration information of COT, the number of DRSs actually transmitted within the SMTC window, and the number of beams used for DRS transmission within the SMTC window. The terminal may receive the corresponding information from the base station, and may estimate the number of DRSs actually transmitted within the SMTC based on the number of beams used for DRS transmission within the SMTC window. In addition, the terminal may estimate the positions where the DRSs are actually transmitted based on the configuration information of COT and the number of DRSs actually transmitted within the SMTC window.

In the exemplary embodiment illustrated in FIG. 15, the base station may transmit information indicating that the starting time point of the COT is between the DRS candidate #1 and the DRS candidate #2 to the terminal. In addition, the base station may inform the terminal of the number of DRSs actually transmitted within the SMTC window. Alternatively, the base station may transmit information for estimating the number of DRSs actually transmitted within the SMTC window (e.g., the number of beams used for DRS transmission within the SMTC window) to the terminal. The terminal may estimate the number of DRSs actually transmitted within the SMTC window based on the information received from the base station. For example, the terminal may estimate that the number of DRSs actually transmitted within the SMTC window is 4. In this case, the terminal may estimate that the DRSs are transmitted in the DRS candidates #2 to #5 based on the configuration information of COT and the number of DRSs actually transmitted within the SMTC window. Accordingly, the terminal may perform a rate matching operation on the DRS candidates #2 to #5.

On the other hand, the terminal may estimate the positions in which the DRSs are actually transmitted by combining at least one of configuration information of a downlink burst period the number of DRSs actually transmitted within the SMTC window, and the number of beams used for DRS transmission within the SMTC window, and perform a rate matching operation at the estimated positions. The downlink burst period may be a period in which the base station starts downlink transmission. The terminal may detect the downlink burst period by using a specific signal present at the starting portion of the downlink burst period and/or a reference signal present in a downlink slot of the downlink burst period. The base station may perform DRS transmission in the DRS candidates after the starting time point of the COT. In the exemplary embodiment shown in FIG. 15, when the starting time point of the COT is between the DRS candidate #1 and the DRS candidate #2, the base station may perform the DRS transmission from the DRS candidate #2.

The terminal may obtain the configuration information of the downlink burst period by detecting the specific signal. The base station may inform the terminal of the number of DRSs actually transmitted within the SMTC window and/or the number of beams used for DRS transmission within the SMTC window. The terminal may receive the corresponding information from the base station, and may estimate the number of DRSs actually transmitted within the SMTC based on the number of beams used for DRS transmission within the SMTC window. In addition, the terminal may estimate the positions where the DRSs are actually transmitted based on the configuration information of COT and the number of DRSs actually transmitted within the SMTC window.

In the exemplary embodiment shown in FIG. 15, the terminal may estimate that the starting time point of the downlink burst period is between the DRS candidate #1 and the DRS candidate #2. The base station may inform the terminal of the number of DRSs actually transmitted within the SMTC window. Alternatively, the base station may transmit information for estimating the number of DRSs actually transmitted within the SMTC window (e.g., the number of beams used for DRS transmission within the SMTC window) to the terminal. The terminal may estimate the number of DRSs actually transmitted within the SMTC window based on the information received from the base station. For example, the terminal may estimate that the number of DRSs actually transmitted within the SMTC window is 4. In this case, the terminal may estimate that the DRSs are transmitted in the DRS candidates #2 to #5 based on the configuration information of the downlink burst period and the number of DRSs actually transmitted within the SMTC window. Accordingly, the terminal may perform a rate matching operation on the DRS candidates #2 to #5.

Figure 20:
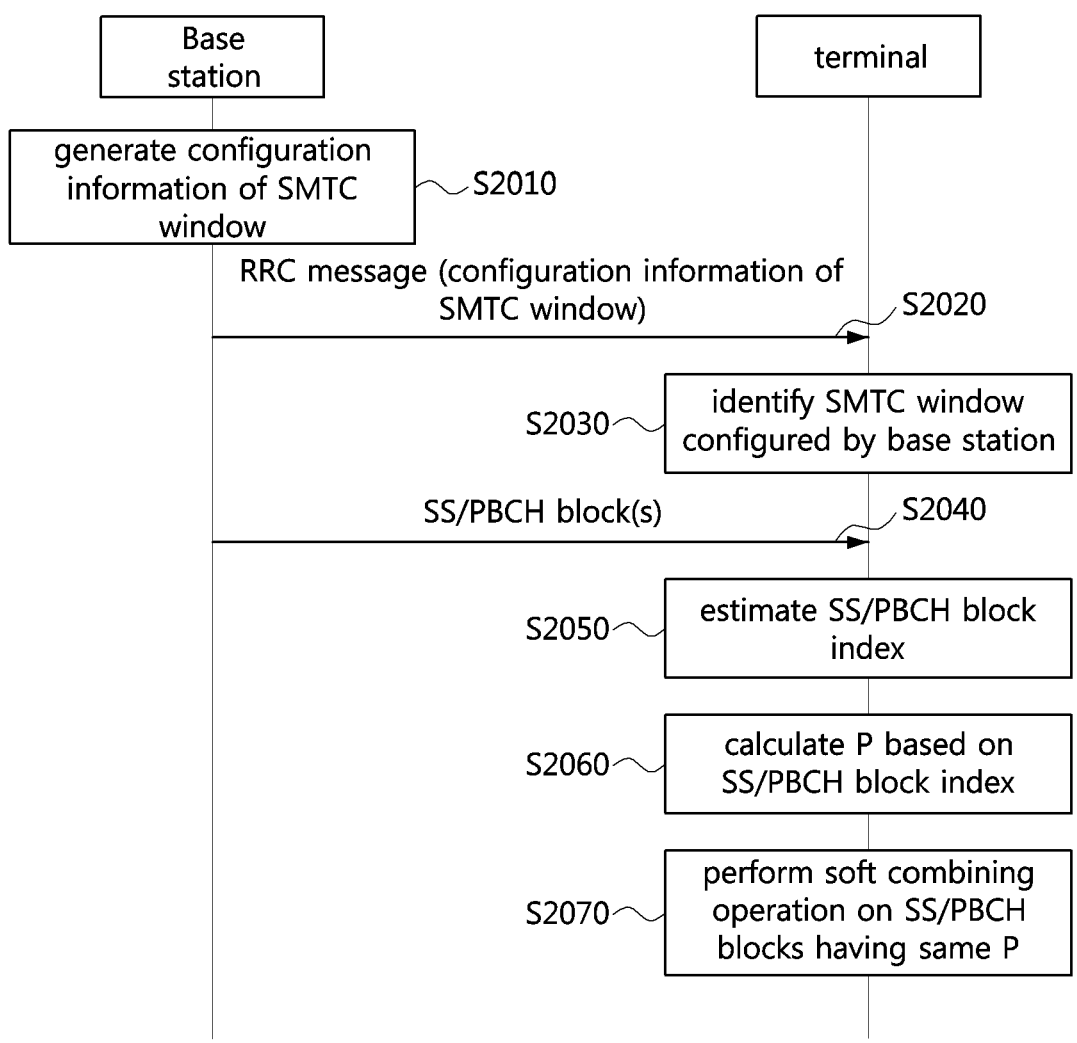
FIG. 20 is a sequence chart illustrating a first exemplary embodiment of a method of transmitting and receiving SS/PBCH blocks in a wireless communication network.

FIG. 20 is a sequence chart illustrating a first exemplary embodiment of a method of transmitting and receiving SS/PBCH blocks in a wireless communication network.

Referring to FIG. 20, a wireless communication network may include a base station and a terminal. The base station may be one of the first base station 110, the second base station 120, and the third base station 130 illustrated in FIG. 1. The terminal may be located within the coverage of the base station, and may operate in an RRC connected state. Each of the base station and the terminal may be configured identically or similarly to the communication node 200 illustrated in FIG. 2.

The base station may generate configuration information of the SMTC window (S2010). The configuration information of the SMTC window may include a duration of the SMTC window, a periodicity of the SMTC window, and an offset of the SMTC window. The duration of the SMTC window may be a duration of one, two, three, four, or five subframes. The periodicity of the SMTC window may be 5, 10, 20, 40, 80, or 160 subframes. The base station may transmit an RRC message (e.g., higher layer message) including the configuration information of the SMTC window (S2020).

The terminal may receive an RRC message from the base station, and may identify the configuration information of the SMTC window included in the RRC message. The terminal may identify the SMTC window configured by the base station based on the configuration information of the SMTC window (S2030). The base station may transmit one or more SS/PBCH blocks (e.g., DRSs including the SS/PBCH blocks) within the SMTC window (S2040). The terminal may receive the SS/PBCH block(s) by performing a monitoring operation in the SMTC window. The terminal may estimate the index(es) of the received SS/PBCH block(s) (or, initialization value(s) of the PBCH DMRS sequence(s) for the received SS/PBCH block(s)) (S2050). For example, when the maximum number of SSB candidates is 4 or 8 in one SMTC window, the terminal may estimate the index of the SS/PBCH block based on the initialization value of the PBCH DMRS sequence for the SS/PBCH block. Alternatively, when the maximum number of SSB candidates in one SMTC window is 64, the terminal may estimate the index of the SS/PBCH block based on a combination of the initialization value of the PBCH DMRS sequence for the SS/PBCH block and a value indicated by the PBCH payload included in the SS/PBCH block.

The terminal may calculate P based on Equation 11 below (S2060).

$$P = A(\text{modulo})Q \qquad \text{[Equation 11]}$$

A may be the index of the SS/PBCH block or the initialization value of the PBCH DMRS sequence (e.g., index of the PBCH DMRS sequence). Q may be the value indicated by the base station. For example, the base station may inform the terminal of Q by using at least one of the SS/PBCH block, an RRC message, system information, a DCI, and a MAC control element (CE). Alternatively, the base station may inform the terminal of information used for estimating Q through at least one of the SS/PBCH block, an RRC message, system information, a DCI, and a MAC CE. For example, Q may be the number of SSB candidates, the number of DRS candidates, the number of SS/PBCH blocks actually transmitted, the number of DRSs actually transmitted, the number of beams used for the SS/PBCH block transmission, or the number of beams used for the DRS transmission.

Alternatively, the base station may inform the terminal of a range of Q by using at least one of the SS/PBCH block, an RRC message, system information, a DCI, and a MAC CE. The terminal may select Q within the range of Q configured by the base station. P may be an index of a beam used for transmission of the SS/PBCH block. Alternatively, P may be a QCL index for the SS/PBCH block.

When a plurality of SS/PBCH blocks are received and there are SS/PBCH blocks having the same P among the plurality of SS/PBCH blocks, the terminal may determine that the SS/PBCH blocks having the same P are transmitted using the same beam. For example, the terminal may determine that the SS/PBCH blocks having the same P have a QCL relationship. Accordingly, the terminal may obtain information (e.g., cell information) included in the corresponding SS/PBCH blocks by performing a soft combining operation on the SS/PBCH blocks having the same P (S2070). The terminal may perform a rate matching operation on the corresponding resources (e.g., resources in which the SS/PBCH blocks are transmitted) based on the information obtained from the SS/PBCH blocks. In addition, the terminal may perform RRM based on the information obtained from the SS/PBCH blocks.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a terminal in a communication system, the operation method comprising:
   receiving a first synchronization signal/physical broadcast channel (SS/PBCH) block from a base station;
   receiving a second SS/PBCH block from the base station;
   calculating a first value using an index of a first PBCH demodulation reference signal (DMRS) sequence of the first SS/PBCH block and a specific value configured by the base station, wherein the specific value is used for determining a quasi-co-located (QCL) relationship;
   calculating a second value using an index of a second PBCH DMRS sequence of the second SS/PBCH block and the specific value; and
   determining that the first SS/PBCH block is quasi co-located with the second SS/PBCH block when the first value is equal to the second value.

2. The operation method according to claim 1, wherein the first SS/PBCH block and the second SS/PBCH block are received in a same transmission window.

3. The operation method according to claim 2, further comprising receiving a radio resource control (RRC) message including information on duration of the same transmission window and the specific value.

4. The operation method according to claim 1, further comprising identifying information included in the first SS/PBCH block and the second SS/PBCH block by performing a combining operation on the first SS/PBCH block and the second SS/PBCH block.

5. The operation method according to claim 1, wherein the specific value is a number of SS/PBCH blocks transmitted from the base station or a number of beams used for transmission of the SS/PBCH blocks.

6. The operation method according to claim 1, wherein the first value is a value of "the index of the first PBCH DMRS sequence modulo the specific value," and the second value is a value of "the index of the second PBCH DMRS sequence modulo the specific value."

7. The operation method according to claim 1, wherein an index of the first SS/PBCH block is determined based on the index of the first PBCH DMRS sequence or a combination of the value of the first PBCH DMRS sequence and a value indicated by a PBCH payload included in the first SS/PBCH block, and an index of the second SS/PBCH block is determined based on the index of the second PBCH DMRS sequence or a combination of the index of the second PBCH DMRS sequence and a value indicated by a PBCH payload included in the second SS/PBCH block.

8. An operation method of a base station in a communication system, the operation method comprising:
   transmitting a radio resource control (RRC) message including information on duration of a transmission window and a specific value used for determining a quasi-co-located (QCL) relationship;
   transmitting a first synchronization signal/physical broadcast channel (SS/PBCH) block in the duration of the transmission window; and
   transmitting a second SS/PBCH block in the duration of the transmission window,
   wherein the first SS/PBCH block is quasi co-located with the second SS/PBCH block when a first value which is calculated using an index of a first PBCH demodulation reference signal (DMRS) sequence of the first SS/PBCH block and the specific value is equal to a second value which is calculated using an index of a second PBCH DMRS sequence of the second SS/PBCH block and the specific value.

9. The operation method according to claim 8, wherein the first value is a value of "the index of the first PBCH DMRS sequence modulo the specific value," and the second value is a value of "the index of the second PBCH DMRS sequence modulo the specific value."

10. The operation method according to claim 8, wherein, when the first SS/PBCH block is quasi co-located with the second SS/PBCH block, a transmission beam of the first SS/PBCH block is equal to a transmission beam of the second SS/PBCH block.

11. The operation method according to claim 8, wherein, when transmission of the first SS/PBCH block is delayed, the first SS/PBCH block includes information indicating an offset between an original transmission position and an actual transmission position of the first SS/PBCH block.

12. The operation method according to claim 8, wherein the specific value is a number of SS/PBCH blocks transmitted from the base station or a number of beams used for transmission of the SS/PBCH blocks.

13. A terminal in a communication system, the terminal comprising a processor and a memory storing at least one instruction executable by the processor, wherein when executed by the processor, the at least one instruction is configured to cause the processor to:
   receive a first synchronization signal/physical broadcast channel (SS/PBCH) block from a base station;
   receive a second SS/PBCH block from the base station;
   calculate a first value using an index of a first PBCH demodulation reference signal (DMRS) sequence of the first SS/PBCH block and a specific value configured by the base station, wherein the specific value is used for determining a quasi-co-located (QCL) relationship;
   calculate a second value using an index of a second PBCH DMRS sequence of the second SS/PBCH block and the specific value; and
   determine that the first SS/PBCH block is quasi co-located with the second SS/PBCH block when the first value is equal to the second value.

14. The terminal according to claim 13, wherein the first SS/PBCH block and the second SS/PBCH block are received in a same transmission window.

15. The terminal according to claim 14, wherein the at least one instruction is further configured to cause the processor to receive a radio resource control (RRC) message including information on duration of the same transmission window and the specific value.

16. The terminal according to claim 13, wherein the at least one instruction is further configured to cause the processor to identify information included in the first SS/PBCH block and the second SS/PBCH block by performing a combining operation on the first SS/PBCH block and the second SS/PBCH block.

17. The terminal according to claim 13, wherein the specific value is a number of SS/PBCH blocks transmitted from the base station or a number of beams used for transmission of the SS/PBCH blocks.

18. The terminal according to claim 13, wherein the first value is a value of "the index of the first PBCH DMRS sequence modulo the specific value," and the second value is a value of "the index of the second PBCH DMRS sequence modulo the specific value."

19. The terminal according to claim 13, wherein an index of the first SS/PBCH block is determined based on the index of the first PBCH DMRS sequence or a combination of the first value of the first PBCH DMRS sequence and a value indicated by a PBCH payload included in the first SS/PBCH block, and an index of the second SS/PBCH block is determined based on the index of the second PBCH DMRS sequence or a combination of the index of the second PBCH DMRS sequence and a value indicated by a PBCH payload included in the second SS/PBCH block.

* * * * *